United States Patent
Freimuth et al.

(10) Patent No.: US 7,493,427 B2
(45) Date of Patent: Feb. 17, 2009

(54) APPARATUS AND METHOD FOR SUPPORTING RECEIVED DATA PROCESSING IN AN OFFLOAD OF NETWORK PROTOCOL PROCESSING

(75) Inventors: Douglas Morgan Freimuth, New York, NY (US); Elbert C. Hu, Elmhurst, NY (US); Ronald Mraz, South Salem, NY (US); Erich M. Nahum, New York, NY (US); Prashant Pradhan, New Rochelle, NY (US); Sambit Sahu, Mahopac, NY (US); John Michael Tracey, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 10/891,196

(22) Filed: Jul. 14, 2004

(65) Prior Publication Data
US 2006/0015618 A1 Jan. 19, 2006

(51) Int. Cl.
G06F 3/00 (2006.01)
G06F 15/167 (2006.01)
G06F 13/00 (2006.01)

(52) U.S. Cl. .................. 710/52; 709/213; 710/56; 711/148; 711/149

(58) Field of Classification Search .............. 710/52
See application file for complete search history.

(56) References Cited

U.S. PATENT DOCUMENTS 5,453,847 A * 9/1995 Ngai .................. 358/451

(Continued)

FOREIGN PATENT DOCUMENTS

GB 2359225 A 8/2001

(Continued)

OTHER PUBLICATIONS

Shivam et al., "EMP: Zero-copy OS-bypass NIC-driven Gigabit Ethernet Message Passing", SC2002 The International Conference for High Performance Computing Communications, Online! Nov. 2001, pp. 1-8. http://www.sc2001.org/papers/pap.pap315.pdf, retrieved Dec. 19, 2005.

(Continued)

Primary Examiner—Niketa I Patel
Assistant Examiner—Zachary K Huson
(74) Attorney, Agent, or Firm—Duke W. Yee; Joseph G. Jones; Gerald H. Glanzman

(57) ABSTRACT

A number of improvements in network adapters that offload protocol processing from the host processor are provided. Specifically, an improved mechanism for handling receipt of data packets in a system utilizing an offload network adapter. The offload network adapter may include logic that permits the offload network adapter to delay notification of data reception to the host system in different ways. The advantage of delaying the notice of data packet reception to the host system is the potential for aggregation of several data packets, which can arrive immediately after the first one, for example, in a single notification. Given a stream with continuous data packet arrival, a value may be set, either statically or dynamically, for notification delay and this value may be configurable for the host system per communication socket.

33 Claims, 10 Drawing Sheets

U.S. PATENT DOCUMENTS

| | | | |
|---|---|---|---|
| 6,154,728 | A * | 11/2000 | Sattar et al. .................... 705/28 |
| 6,711,650 | B1 * | 3/2004 | Bohrer et al. ................ 711/118 |
| 6,735,620 | B1 | 5/2004 | Blackmore et al. |
| 6,996,070 | B2 * | 2/2006 | Starr et al. .................. 370/252 |
| 7,020,712 | B1 * | 3/2006 | Chin ........................ 709/234 |
| 7,113,479 | B2 * | 9/2006 | Wong ........................ 370/235 |
| 7,152,033 | B2 | 12/2006 | Gupta et al. ................ 704/270 |
| 7,340,558 | B2 * | 3/2008 | Lee et al. ....................... 711/5 |
| 2003/0037170 | A1 * | 2/2003 | Zeller et al. ................. 709/253 |
| 2003/0046330 | A1 | 3/2003 | Hayes |
| 2003/0061362 | A1 * | 3/2003 | Qiu et al. .................... 709/229 |
| 2003/0110325 | A1 | 6/2003 | Roach et al. |
| 2003/0204631 | A1 * | 10/2003 | Pinkerton et al. .......... 709/249 |
| 2004/0003126 | A1 | 1/2004 | Boucher et al. |
| 2004/0030806 | A1 | 2/2004 | Pandya |
| 2004/0042483 | A1 | 3/2004 | Elzur et al. |
| 2004/0103225 | A1 | 5/2004 | McAlpine et al. |

FOREIGN PATENT DOCUMENTS

| | | |
|---|---|---|
| WO | WO 2004/021150 A2 | 3/2004 |
| WO | WO 2004/051489 A2 | 6/2004 |

OTHER PUBLICATIONS

Tipparaju et al., "Host-Assisted Zero-Copy Remote Memory Access Communication on InfiniBand", Proceedings of the 18th International Parallel and Distributed Processing Symposium, IEEE 2004, pp. 1-10. http://www.ieeexplore.ieee.org/iel5/9132/28950/01302943.pdf, retrieved Dec. 20, 2005.

Pratt et al., "Arsenic: A User-Accessible Gigabit Ethernet Interface", Proceedings of the IEEE INFOCOM 2001, Apr. 2001, XP010538586, pp. 67-76.

Hoskote et al., "A 10 GHz TCP Offload Accelerator for 10Gb/s Ethernet in 90nm Dual-V CMOS", 2003 IEEE International Solid-State Circuits Conference, Session 14/Microprocessors/Paper 14.7, Sep. 2003, pp. 1-10.

Yeh et al., "Introduction to TCP/IP Offload Engine (TOE)", Version 1.0, 10 Gigabit Enthernet Alliance, Newport Beach, CA, Apr. 2002, 6 pages.

Freimuth et al., Apparatus and Method for Supporting Memory Management in an Offload of Network Protocol Processing.

Freimuth et al., Apparatus and Method for Supporting Connection Establishment in an Offload of Network Protocol Processing.

* cited by examiner

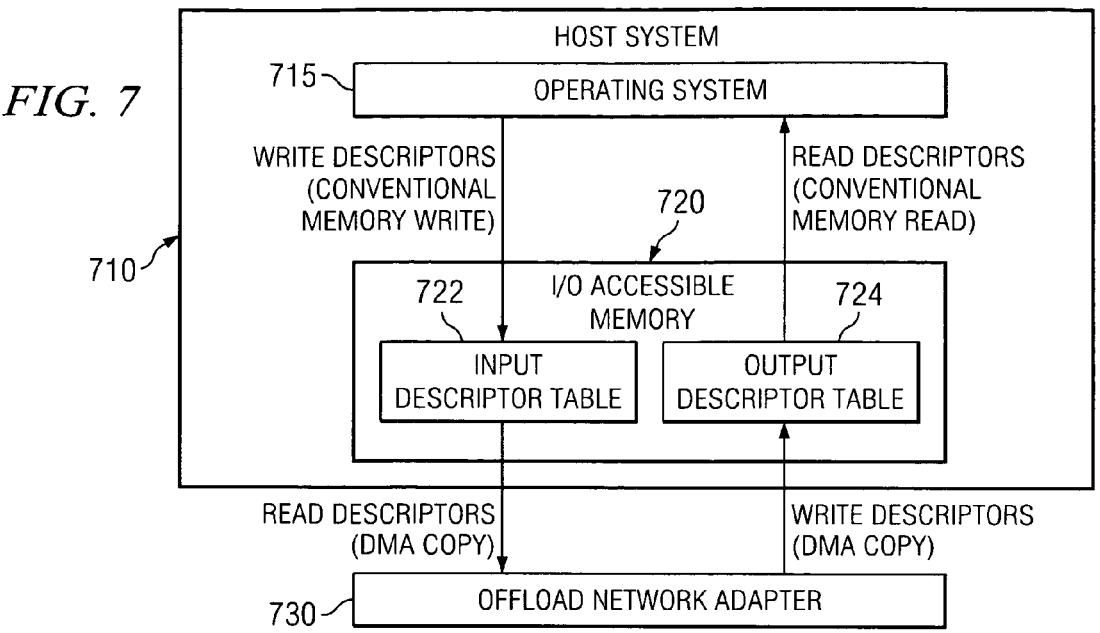
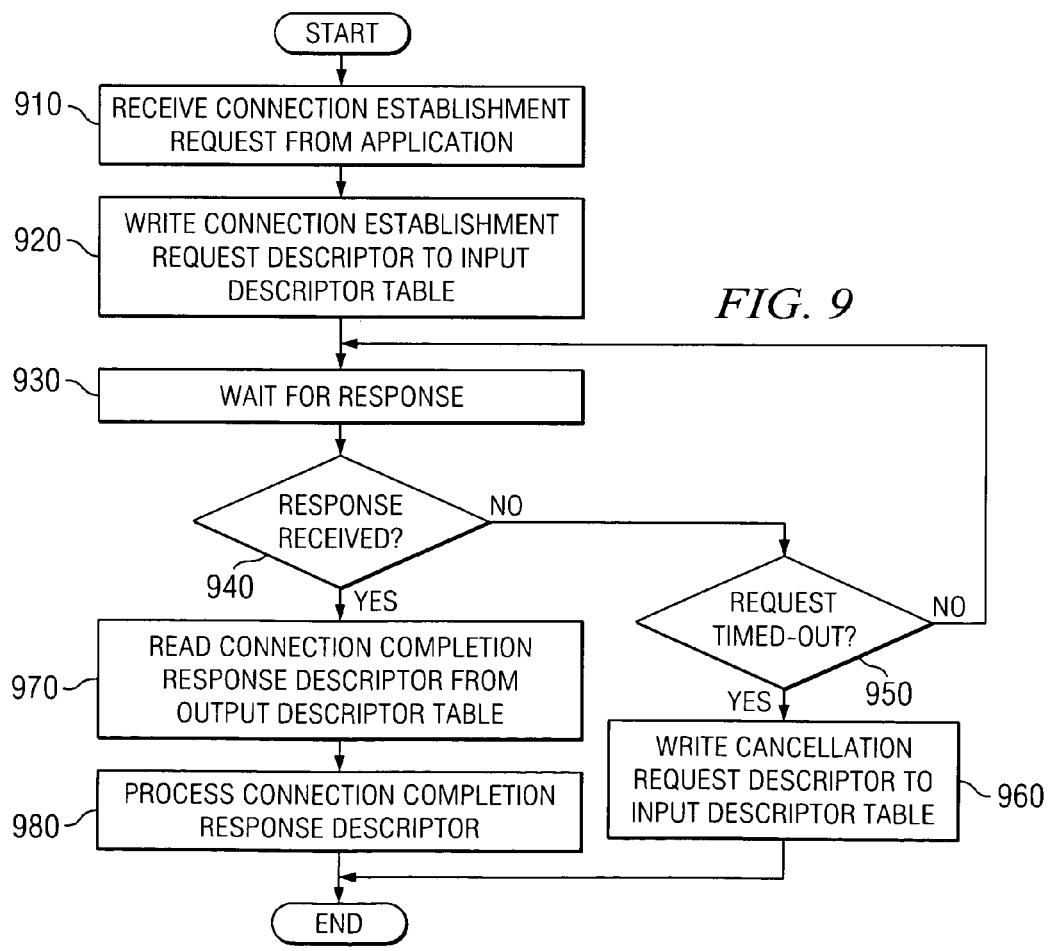

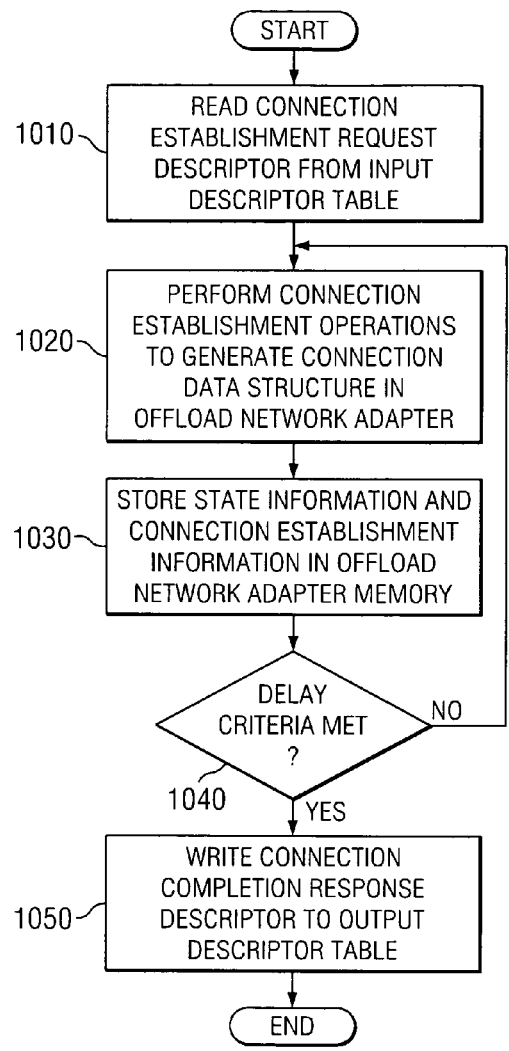
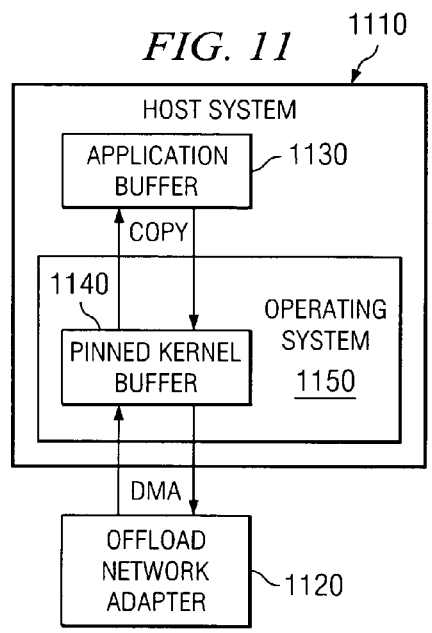
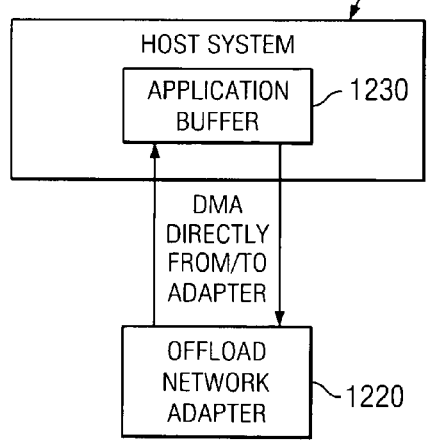

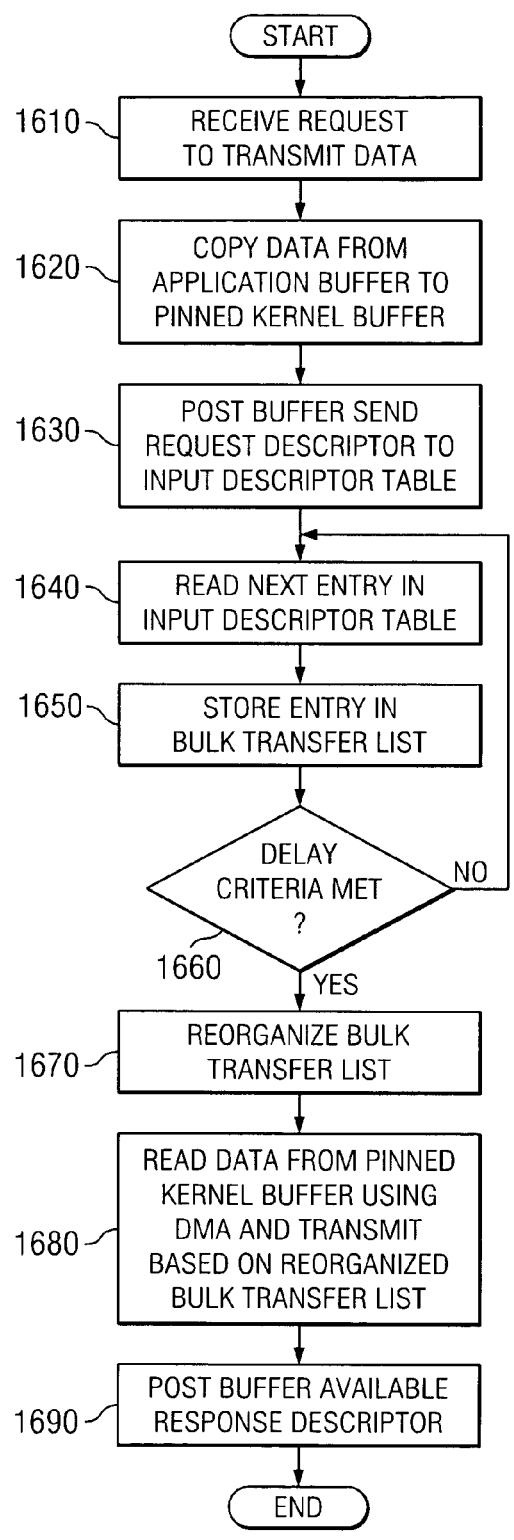
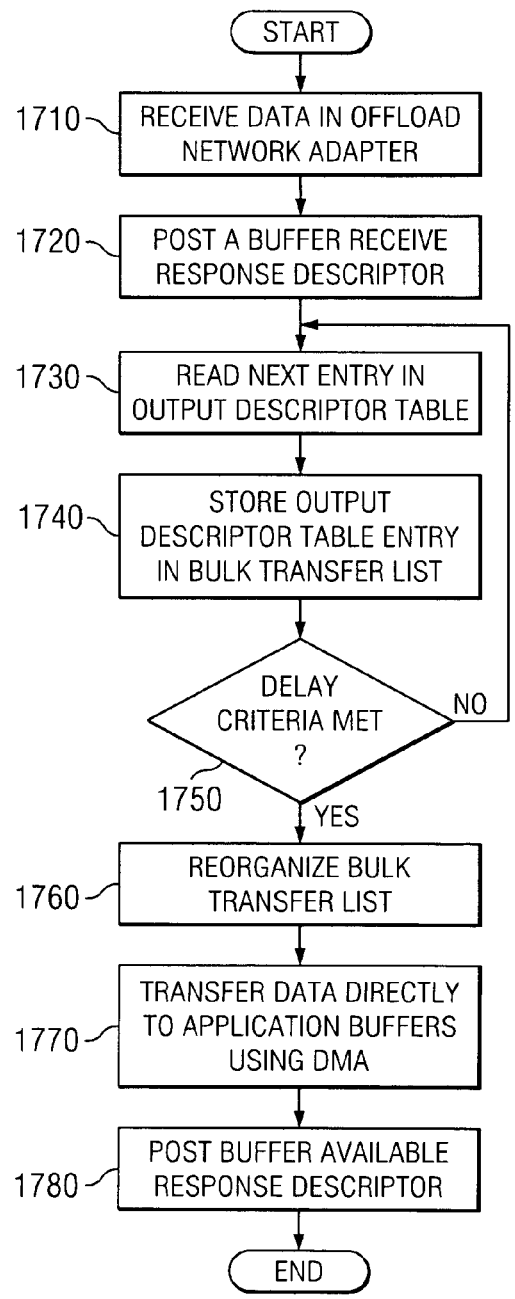

APPARATUS AND METHOD FOR SUPPORTING RECEIVED DATA PROCESSING IN AN OFFLOAD OF NETWORK PROTOCOL PROCESSING

RELATED APPLICATIONS

The present application is related to co-pending and commonly assigned U.S. patent application Ser. No. 10/890,978 filed Jul. 14, 2004 entitled "Apparatus and Method for Supporting Memory Management in an Offload of Network Protocol Processing" and U.S. patent application Ser. No. 10/890,710 filed Jul. 14, 2004 entitled "Apparatus and Method for Supporting Connection Establishment in an Offload of Network Protocol Processing," both of which are filed on even date herewith and hereby incorporated by reference.

BACKGROUND OF THE INVENTION

1. Technical Field

The present invention is generally directed to an improved data processing system. More specifically, the present invention is directed to a method and apparatus for supporting received data processing operations in an offload network adapter.

2. Description of Related Art

In known systems, the operating system communicates with a conventional network interface only in terms of data transfer by providing the network interface with two queues of buffers. A first queue of buffers is made up of descriptors that point to read-made data packets in host memory that are read for transmission. A second queue of buffers includes descriptors that point to buffers filled with unprocessed data packets in host memory that have been received for processing. The network interface provides a memory-mapped input/output (I/O) interface for informing the network interface where the queues are in physical memory and provides an interface for some control information, such as what interrupt to generate when a data packet arrives.

Network protocol processing for convention network interfaces is performed entirely within the host with only data packets being provided to the network adapter for transmission. However, network link speeds have increased faster than the growth of microprocessor performance. As a result, the host processor becomes burdened with large amounts of TCP/IP protocol processing, reassembling out-of-order data packets, resource-intensive memory copies, and interrupts. In some high-speed networks, the host processor has to dedicate more processing to handle the network traffic than to the applications it is running. Thus, the data packet is processed in the host at a lower rate than the network speed.

In order to address this problem, recent emphasis has been on offloading the processing of the TCP/IP protocols from the host processor to the hardware on the network adaptor. Such network adapters, which are sometimes referred to as an intelligent network adapter or a TCP/IP Offload Engine (TOE), can be implemented with a network processor and firmware, specialized ASICs, or a combination of both. These network adapters not only offload host processor processing so that application performance is increased, but also enable communication with new types of networks and devices, such as iSCSI storage area networks (SANs) and high performance network attached storage (NAS) applications.

While these network adapters offload the TCP/IP protocol processing of data packets, much of the processing that is needed for communication over networks is still maintained within the host system. For example, the host system is still responsible for establishing connections, maintaining state information for each of the established connections, handling memory management, and the like. Thus, the host system still experiences processor load due to these operations having to be performed in the host system and furthermore, due to the amount of communication that is required between the host system and the network adapter to perform these operations in the host system. Thus, it would be beneficial to have an apparatus and method for improving the operation of a network adapter such that the processing load on the host system is minimized and more of the processing is performed in the network adapter.

SUMMARY OF THE INVENTION

The present invention provides number of improvements in network adapters that offload protocol processing from the host processor, hereafter referred to as an offload network adapter. Specifically, the present invention provides mechanisms for handling memory management and optimization within a system utilizing an offload network adapter. In addition, the present invention provides a mechanism for improving connection establishment in a system utilizing an offload network adapter. Furthermore, the present invention provides an improved mechanism for handling receipt of data packets in system utilizing an offload network adapter.

One aspect of the present invention is the ability to offload connection establishment and maintenance of connection state information to the offload network adapter. As a result of this offloading of connection establishment and state information maintenance, the number of communications needed between the host system and the offload network adapter may be reduced. In addition, offloading of these functions to the offload network adapter permits bulk notification of established connections and state information to the host system rather than piecemeal notifications as is present in known computing systems.

In addition to connection establishment, the present invention improves upon memory management in a data processing system that utilizes an offload network adapter. The memory management according to the present invention permits both buffered sending and receiving of data as well as zero-copy sending and receiving of data. In addition, the present invention permits grouping of DMA buffers that can be shared among specified connections based on any number of attributes. The present invention further permits partial send and receive buffer operation, delaying of DMA requests so that they may be communicated to the host system in bulk, and a mechanism for expedited transfer of data to the host system.

In addition to connection establishment and memory management, the present invention improves upon the handling of received data in a data processing system that utilizes an offload network adapter. The offload network adapter of the present invention may include logic that permits the offload network adapter to delay notification of data reception to the host system in different ways. The advantage of delaying the notice of data packet reception to the host system is the potential for aggregation of several data packets, which can arrive immediately after the first one, for example, in a single notification. Given a stream with continuous data packet arrival, a value may be set for notification delay and this value may be configurable for the host system per communication socket.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an exemplary diagram illustrating aspects of one exemplary embodiment of the present invention with regard to the Offload Network Adapter Programming Interface of the present invention;

FIG. 9 is a flowchart outlining an exemplary operation of a host system of the present invention when establishing a connection using an offload network adapter;

FIG. 10 is a flowchart outlining an exemplary operation of an offload network adapter when establishing a connection in accordance with one exemplary embodiment of the present invention;

FIG. 11 is an exemplary diagram illustrating a memory management mechanism in accordance with the present invention in which buffered sending and receiving of data is utilized;

FIG. 12 is an exemplary diagram illustrating a zero-copy operation in accordance with one exemplary embodiment of the present invention;

FIG. 16 is a flowchart outlining an exemplary operation when sending data using a host system and offload network adapter in accordance with aspects of one exemplary embodiment of the present invention;

FIG. 17 is a flowchart outlining an exemplary operation when performing a zero copy transfer of data between a host system and an offload network adapter in accordance with aspects of one exemplary embodiment of the present invention.

DETAILED DESCRIPTION OF THE PREFERRED EMBODIMENT

Figure 1:
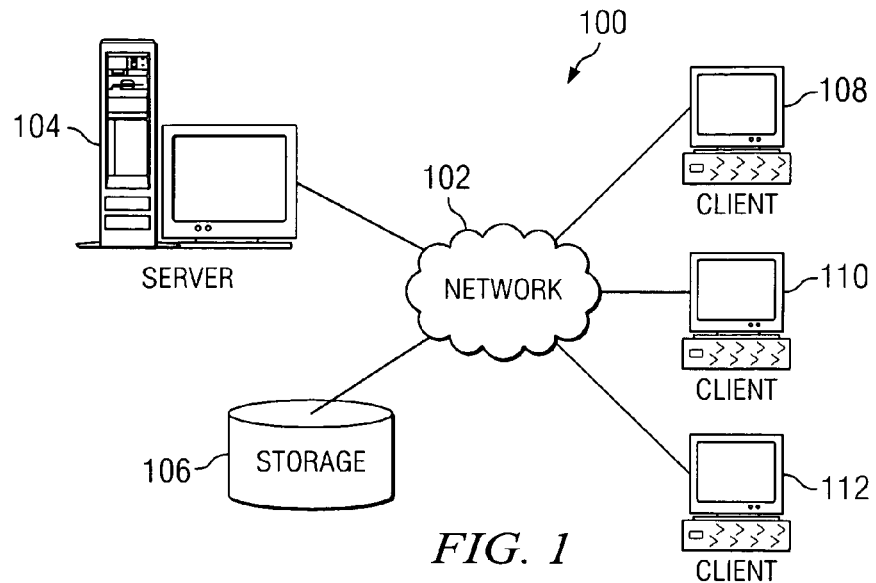
FIG. 1 is an exemplary diagram of a distributed data processing system in which aspects of the present invention may be implemented.
Figure 2:
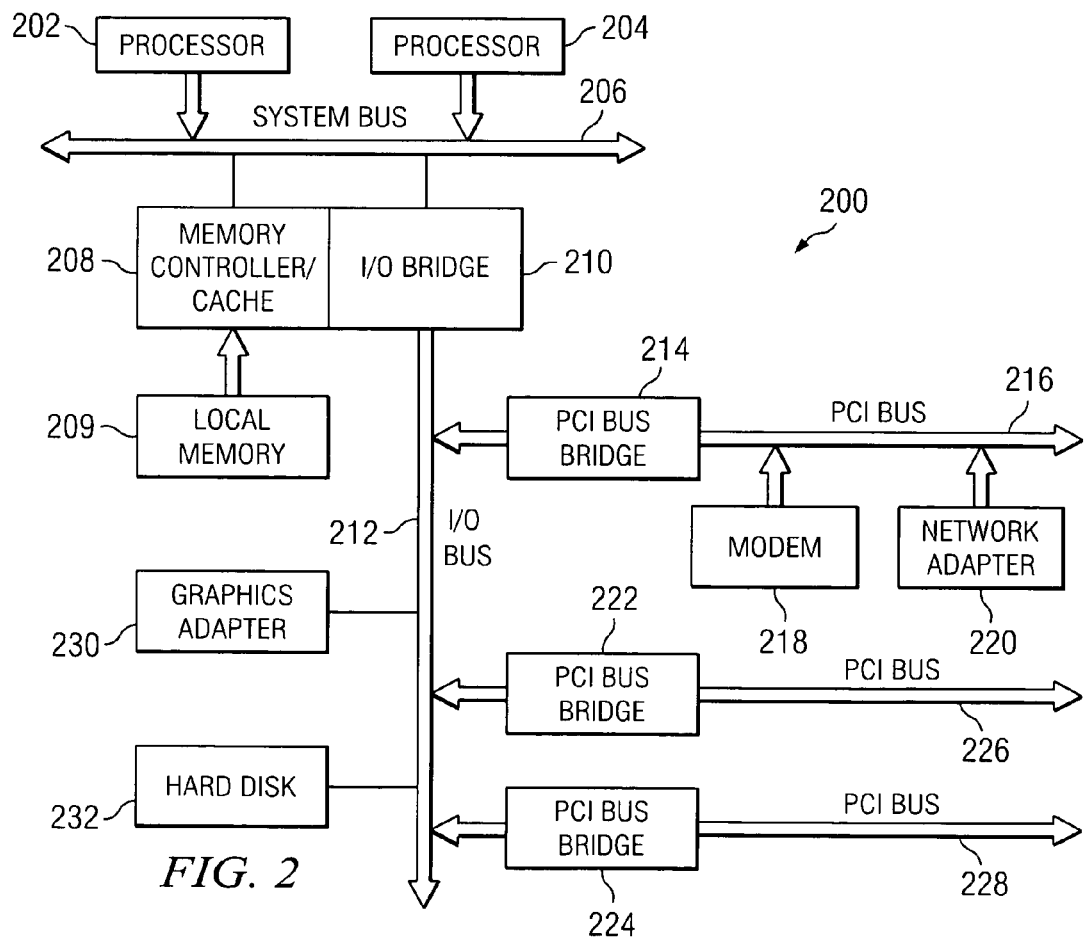
FIG. 2 is an exemplary diagram of a server computing device in which aspects of the present invention may be implemented.
Figure 3:
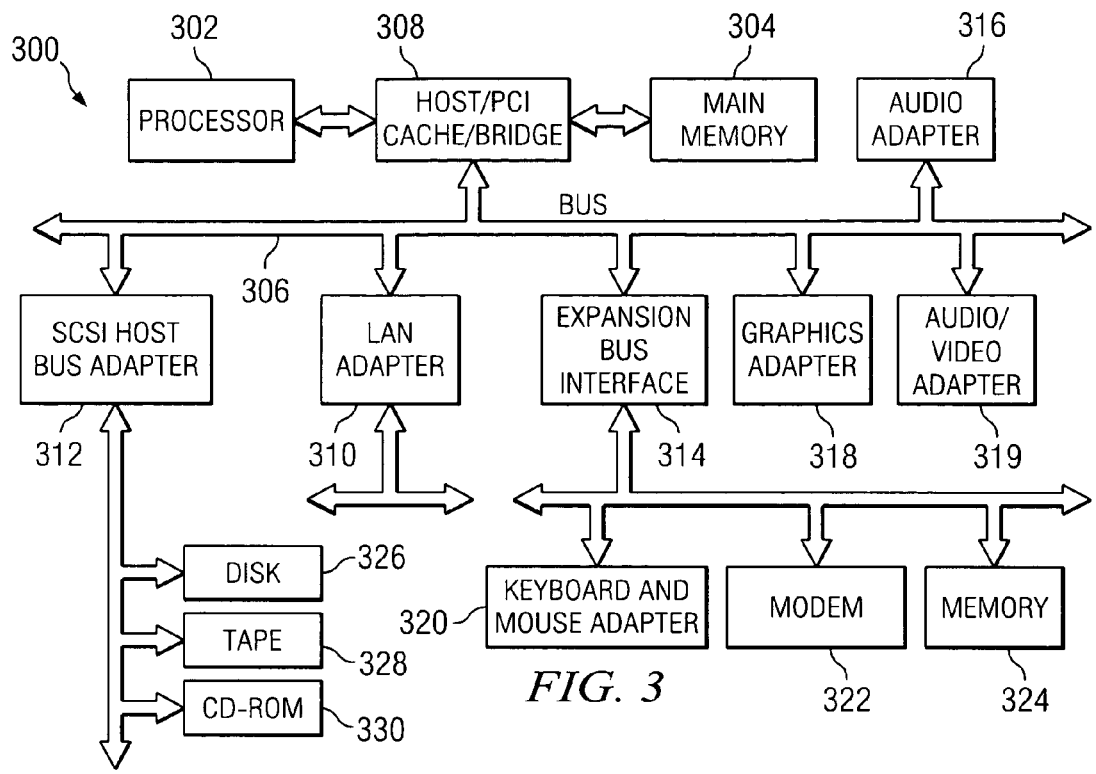
FIG. 3 is an exemplary diagram of a client computing device in which aspects of the present invention may be implemented.

The present invention is directed to an apparatus and method for improving the operation of an offload network adapter, i.e. a network adapter that performs some or all of the network protocol processing and thus, offloads processing from the host. Since the present invention is related to offload network adapters, the present invention is especially well suited for use with a distributed data processing system having one or more networks. FIGS. 1-3 are provided as an example of such a distributed data processing environment in which aspects of the present invention may be implemented. It should be appreciated that FIGS. 1-3 are only exemplary and many modifications to these exemplary environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like,-may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
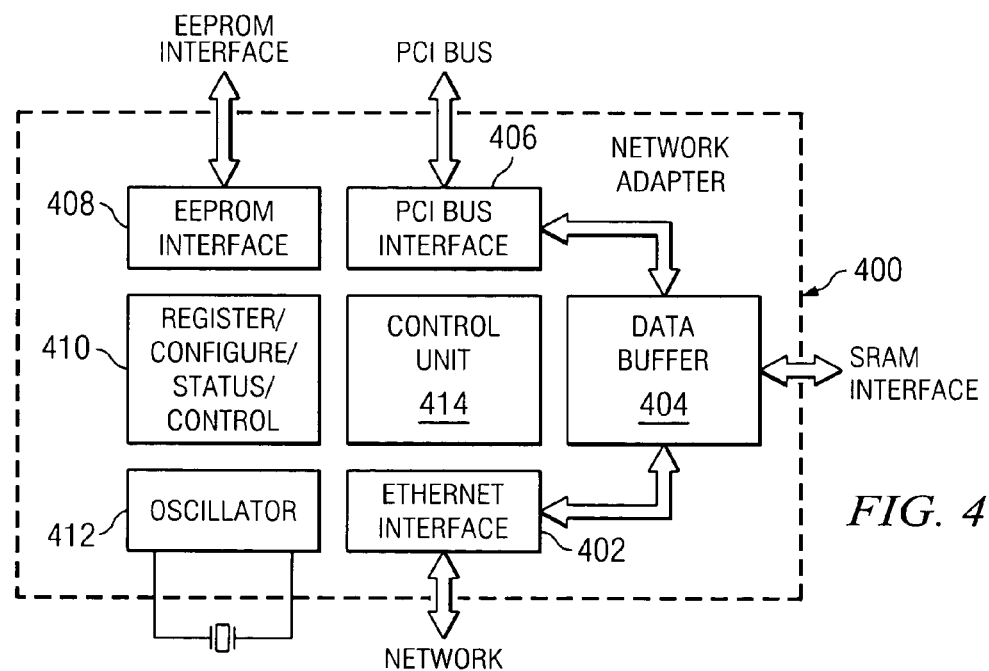
FIG. 4 is an exemplary diagram of a network adapter in accordance with one exemplary embodiment of the present invention.

Turning now to FIG. 4, a diagram of a network adapter is depicted in accordance with a preferred embodiment of the present invention. Network adapter 400 may be implemented as a network adapter 220 in FIG. 2, LAN adapter 310 in FIG. 3, or the like. As shown, network adapter 400 includes Ethernet interface 402, data buffer 404, and PCI bus interface 406. These three components provide a path between the network and the bus of the data processing system. Ethernet interface 402 provides an interface to the network connected to the data processing system. PCI bus interface 406 provides an interface to a bus, such as PCI bus 216 or 306. Data buffer 404 is used to store data being transmitted and received through network adaptor 400. This data buffer also includes a connection to an SRAM interface to provide for additional storage.

Network adaptor 400 also includes electrically erasable programmable read-only memory (EEPROM) interface 408, register/configure/status/control unit 410, oscillator 412, and control unit 414. EEPROM interface 408 provides an interface to an EEPROM chip, which may contain instructions and other configuration information for network adaptor 400. Different parameters and setting may be stored on an EEPROM chip through EEPROM interface 408. Register/configure/status/control unit 410 provides a place to store information used to configure and run processes on network adaptor 400. For example, a timer value for a timer may be stored within these registers. Additionally, status information for different processes also may be stored within this unit. Oscillator 412 provides a clock signal for executing processes on network adaptor 400.

Control unit 414 controls the different processes and functions performed by network adaptor 400. Control unit 414 may take various forms. For example, control unit 414 may be a processor or an application-specific integrated chip (ASIC). In these examples, the processes of the present invention used to manage flow control of data are executed by control unit 414. If implemented as a processor, the instructions for these processes may be stored in a chip accessed through EEPROM interface 408.

Data is received in receive operations through Ethernet interface 402. This data is stored in data buffer 404 for transfer onto the data processing system across PCI bus interface 406. Conversely, data is received from the host system for transmission via the PCI bus interface 406 and is stored in the data buffer 404.

Figure 5:
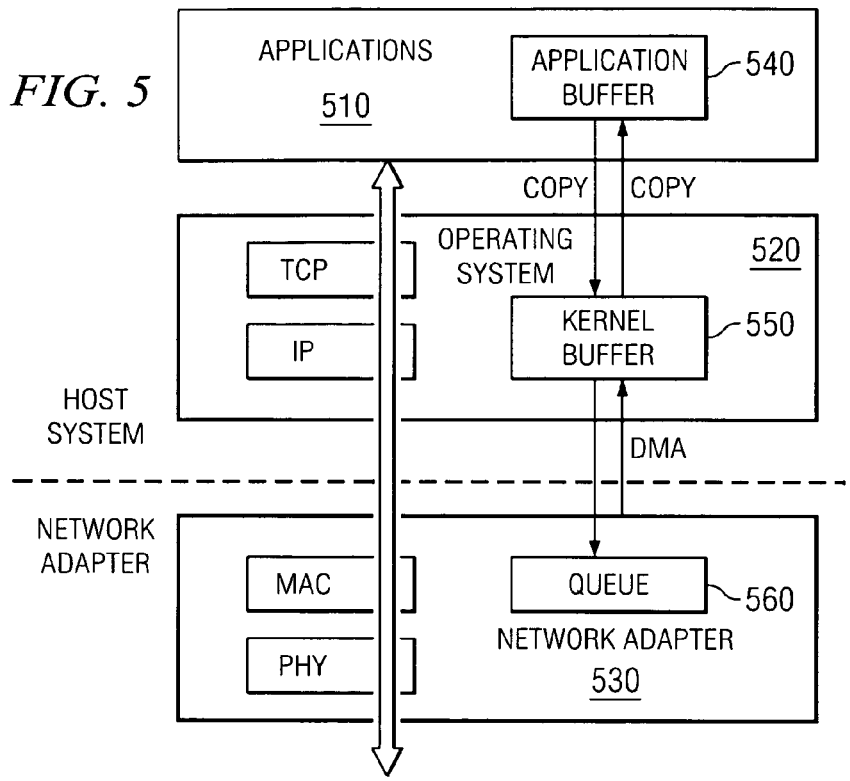
FIG. 5 is a diagram illustrating TCP/IP processing in a system utilizing a conventional network interface card.

In conventional data processing systems, the processing of the data that is transmitted to/from a host system via a network adapter is performed within the host system. FIG. 5 illustrates the manner by which conventional processing of data packets in a TCP/IP protocol stack is performed. As shown in FIG. 5, the application software 510 sends and receives data via the operating system 520 and the network adapter 530. Processing of the data through the TCP/IP protocol stack is performed with the operating system 520 performing TCP/IP protocol processing to either generate formatted data packets for transmission or extract and route the data in a data packet to an appropriate application 510. These operations are performed in software on the host system.

The formatted data packets are sent/received in hardware via the network adapter 530. The network adapter 530 operates on the data packets from a media access control and physical layer. The media access control layer is the services that control access to the physical transmission medium on a network. MAC layer functionality is built into the network adapter and includes a unique serial number that identifies each network adapter. The physical layer is the layer that provides services for transmission of bits over the network medium.

As shown in FIG. 5, in a conventional network interface, when data is to be sent over the network from the host system, the data is first copied from an application buffer 540 in user space into a pinned kernel buffer 550 and an entry in a network adapter queue 560 is generated for queuing the data to the network adapter 530 for transmission. When data is received from the network for an application 510 on the host system, the data packet is written to the host kernel buffer 540 using a direct memory access (DMA) operation. The data is then later copied by the host into the application's buffer 540 in user space when the application calls receives( ).

Figure 6:
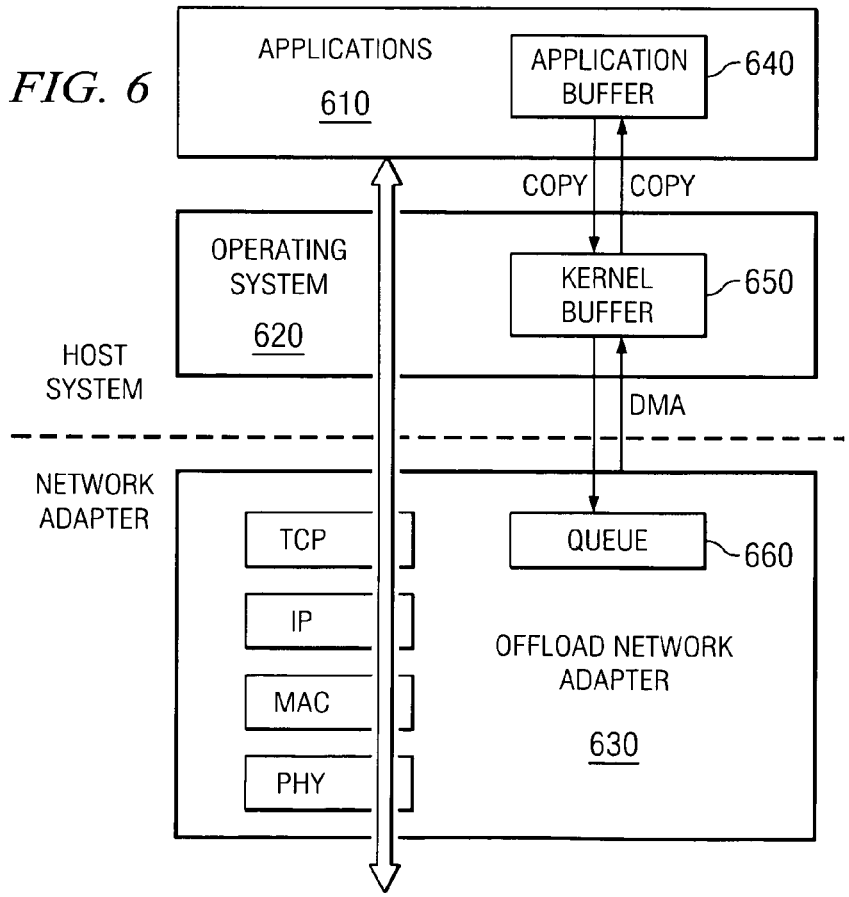
FIG. 6 is a diagram illustrating TCP/IP processing in a system utilizing a TCP/IP Offload Engine or offload network adapter.

FIG. 6 illustrates the manner by which an offload network adapter processes data packets in a TCP/IP protocol stack. As shown in FIG. 6, the TCP and IP processing that is conventionally performed in the operating system 620 of the host system is moved so that it is performed within the offload network adapter 630. As a result, the processing performed by the host system is reduced such that the applications 610 may be executed more efficiently.

With known offload network adapters, the buffered sends and receives described above with regard to FIG. 5 are still necessary even though the processing of the TCP/IP stack has been shifted to the network adapter 630. That is, as shown in FIG. 6, for sending of data packets from the host system, data is first copied from the application's buffer 640 in user space to the kernel buffer 650 where it is queued in the network adapter queue 660 for processing by the network adapter. Similarly, with received data packets, the data is DMA'd to the kernel buffer 650 and at a later time is copied into the application buffer 640 in user space.

Thus, as with the convention case above, in known offload network adapters, there is still a need to copy data between the user space application buffer 640 and the kernel space kernel buffer 650. Such copy operations must be performed in the host system for every data packet that is being sent or received. The overhead associated with such copy operations reduces the availability of the host processor to run applications.

In addition, while the TCP/IP protocol processing of data packets may be offloaded to the offload network adapter 630, actual connection establishment and maintaining of state information for each established connection is still the responsibility of the host system, e.g., operating system 620. That is, the host must still perform the necessary operations to establish outbound and inbound connections. In addition, the host must exchange messages with the network adapter as the state of each connection changes so that the state information stored in the host system for each connection may be maintained.

As a result, while offloading TCP/IP protocol processing from the host system to the network adapter has improved the throughput of computing systems, additional improvement may be obtained by improving the manner by which memory is managed in such offload network adapter systems and improving the manner by which connections are established such that connection establishment is offloaded and messaging between the host and the network adapter is minimize. Moreover, improvement of the operation of the network adapter may be obtained by improving the manner by which data is received in an offload network adapter such that interaction between the network adapter and the host system is minimized.

The present invention provides mechanisms for improving the operation of an offload network adapter such that interaction between the host system and the network adapter is minimized. The present invention provides an improved interface between the operating system of the host system and the offload network adapter. This interface includes a control portion and a data portion. The interface makes use of queues of buffers which are used with explicit data structures that indicate both the control and data portions of the interface. The control portion of the interface allows the host system to instruct the offload network adapter and allows the offload network adapter to instruct the host system. For example, the host system may instruct the network interface as to which port numbers to listen to, and the offload network adapter may instruct the host system as to the establishment of a new connection, receipt of data, etc. The data portion of the interface provides a mechanism for transfer of data on established connections both for sending and receiving. The control portion of the interface may be invoked by using conventional socket application programming interfaces (APIs) that control connections, e.g., socket( ), bind( ), listen( ), connect( ), accept( ), setsockopt( ), etc. The data portion of the interface may be invoked by socket APIs for sending or receiving data, e.g., send( ), sendto( ), write( ), writev( ), read( ), readv( ), etc.

FIG. 7 is an exemplary diagram illustrating communication between the host system and an offload network adapter using the Offload Network Adapter Programming Interface of the present invention. The Offload Network Adapter Programming Interface provides a communication interface between the host system and the offload network adapter that is primarily based on direct memory access (DMA) operations, or DMAs, for writing and reading request and response descriptors in reserved portions of I/O accessible memory on the host system.

As shown in FIG. 7, the host system 710 submits requests for data transfers either to or from the offload network adapter 730, and the offload network adapter 730 responds with notifications of success or failure for the requests. Requests and responses are packaged into data structures called request descriptors and response descriptors. The descriptors are written into and read from two physical regions in I/O accessible memory 720 on the host system 710. These regions are called the input descriptor table 722 and the output descriptor table 724 and are used in a producer-consumer fashion.

The input descriptor table 722 is read by the offload network adapter 730 and written to by the host system 710 to submit control and data interface requests. The output descriptor table 724 is read by the host system 710 and written to by the offload network adapter 730, which uses the output descriptor table 724 to indicate results of previous requests and to notify the host system 710 of data arrivals.

While both the host system 710 and the offload network adapter 730 read from and write to these descriptor tables 722 and 724, to do not access the descriptors in the same way. The host system 710 uses conventional memory reads and writes to access the descriptor tables 722 and 724. However, the offload network adapter uses DMA operations to copy arbitrary sets of descriptors to and from the descriptor tables 722 and 724.

As with conventional network adapters, the host system 710 may be informed of new response descriptors in the output descriptor table 724 from the offload network adapter 730 by either polling or receiving interrupts, for example. That is, when a data packet is received in the offload network adapter, and certain criteria are met for notification of the arrival of the data packet to the host system 710, as will be discussed in greater detail hereafter, a response descriptor may be generated by the offload network adapter 730 and written to the output descriptor table 724. An interrupt may then be received by the operating system 715 indicating the new descriptor in the output descriptor table 724. Alternatively, the host system 710 may periodically poll the output descriptor table 724 for new descriptors. If the output descriptor table 724 is in danger of overflowing, the offload network adapter 730 may raise an interrupt to the host system 710 to notify it of the situation.

In one exemplary embodiment of the present invention, the descriptors that are written to the descriptor tables 722 and 724 are 256 bits/32 bytes and are structured as follows: descriptor owner (1 bit), descriptor type (5 bits), descriptor content (250 bits). The owner bit is used for the producer/consumer relationship of the descriptor in the descriptor tables 722 and 724. In other words, since there are two components communicating, e.g., the host operating system and the offload network adapter a producer/consumer relationship is present. A single bit can be used to denote the ownership of the descriptor. For example, a "1" may denote a host generated descriptor and a "zero" may denote an offload network adapter generated descriptor, or vice versa.

The descriptor type identifies the operation and/or request that is associated with the descriptor. For example, a request descriptor may consist of one of the following types: buffer send, buffer available, connect request, termination request, listen request, cancellation request, connection attribute control and network adapter attribute control.

The buffer send descriptor type is associated with a request to allocate a buffer for storing data to be sent and identifies the buffer, the connection identifier to use, and the value of an ASAP bit, described hereafter. The buffer available descriptor type is associated with a request to allocate a buffer for storing received data and identifies a buffer for storing the received data and the connection identifier over which the data is to be received. The connection request descriptor type is associated with a request to initiate a connection on a specified local port and protocol. The termination request descriptor type us associated with a request to tear down a specified connection. The listen request descriptor type is associated with a request indicating a willingness to receive connections on a port and protocol. The cancellation request descriptor type is associated with a request to cancel a previously submitted send, connect or listen request. The connection attribute control descriptor type is associated with requests to get or set connection attributes. The network adapter attribute control descriptor type is associated with requests to get or set network adapter-wide attributes.

Response descriptors may have various types as well. For example, a response descriptor may be one of the following types: buffer receive, buffer available, connection arrival, connection completion, listen response, termination response, cancellation response, connection attribute, and network adapter attribute. The buffer receive descriptor type identifies a buffer that has data available and identifies which connection the data is for. The buffer available descriptor type identifies a DMA is complete and that a send buffer is available. The connection arrival descriptor type notifies the host that a new connection has arrived and includes the connection identifier. The connection completion descriptor type notifies the host that a connect request has succeeded or failed. The listen response descriptor type indicates the success/failure of a submitted listen request. The termination response descriptor type indicates success/failure of a submitted close request. The cancellation response descriptor type indicates success/failure of a submitted cancellation request. The connection attribute descriptor type indicates an old connection attribute value or new value success/failure. The network adapter attribute descriptor type indicates an old network adapter attribute value or a new network adapter attribute value success/failure.

In one exemplary embodiment of the present invention, the descriptor content field for the buffer send request, the buffer available request, buffer receive response, and buffer available response descriptors are all formatted with the following fields:

| | | |
|---|---|---|
| Base | 64 bits | Base physical address of the buffer |
| Len | 32 bits | Length of the buffer in bytes |
| Conn ID | 64 bits | Unique connection identifier given by the network adapter |
| ASAP | 1 bit | Request to DMA as soon as possible (discussed hereafter) |
| Modify | 1 bit | Indicates whether this buffer has been modified (discussed hereafter) |

The connection ID (Conn ID) is a value to unique identify the connection and is provided by the offload network adapter in response to a connect request and as a response for connection arrivals. The connection ID 0 (zero) is reserved for meaning "no connection." This is used, for example, to indicate that a buffer may be used for any connection (e.g., for data on a passively accepted connection that has no ID yet). Buffers not associated with any particular connection are called "bulk buffers."

The ASAP and modify fields are only used for the buffer send request descriptor. The ASAP bit indicates a desire to have this buffer DMA'd as quickly as possible. The modify bit is for notifying the offload network adapter whether or not this particular buffer has been changed since the last time it was presented to the offload network adapter. This allows the offload network adapter to determine whether or not it already has a copy of this buffer in local memory and thus, avoid the DMA transfer is possible.

A control descriptor describes a control buffer, which in turn contains a variable number of arbitrary-length attribute tuples. The descriptor content field for a control descriptor, a connect request, a termination request, a listen request, a cancellation request and their respective responses are all formatted with the following fields:

| | | |
|---|---|---|
| Number | 8 bits | number of attribute tuples in control buffer |
| Base | 64 bits | Base physical address of the control buffer |
| Len | 32 bits | Length of the control buffer in bytes |
| Conn ID | 64 bits | Unique connection identifier |

The control buffer and descriptor content fields for connection attribute requests, offload network adapter attribute requests, and their respective responses, are all formatted with the following fields:

| | | |
|---|---|---|
| Get/Set | 1 bit | Indicates whether attribute is to be retrieved or updated |
| Attribute | 15 bits | Identifies attribute for reading/writing |
| Length | 32 bits | Length of attribute data |
| Value | N/A | Actual attribute value, length is specified by prev. field |

The above control descriptor is meant to be as general as possible. Due to the volume of attributes that may be specified by the control descriptors, they cannot all be illustrated herein. Examples of network interface control attributes include IP address, domain name, and routing information. Examples of per-connection control attributes include receive window size, Nagle algorithm setting, and SACK support.

With the present invention, the offload network adapter 730 has logic, such as in the firmware, ASICs, etc. of the offload network adapter 730, for making use of the Offload Network Adapter Programming Interface of the present invention. That is, the offload network adapter 730 has logic for recognizing request descriptors, processing the request descriptors and corresponding data, and logic for generating response descriptors to be written to the output descriptor table 724. Similarly, the operating system 715, a device driver loaded by the operating system 715, or the like, of the host system has logic for generating request descriptors to be written to the input descriptor table 722, recognizing response descriptors read from the output descriptor table 724, and logic for processing the response descriptors and corresponding data.

Having given a general overview of the interaction between the host system and the network adapter using the descriptors of the Offload Network Adapter Programming Interface of the present invention, the following description will illustrate how this interface facilitates improved connection establishment, memory management, and receipt of data using an offload network adapter.

Connection Establishment

One aspect of the present invention is the ability to offload connection establishment and maintenance of connection state information to the offload network adapter. As a result of this offloading of connection establishment and state information maintenance, the number of communications needed between the host system and the offload network adapter may be reduced. In addition, as discussed hereafter, offloading of these functions to the offload network adapter permits bulk notification of established connections and state information to the host system rather than piecemeal notifications as is present in known computing systems.

Figure 8:
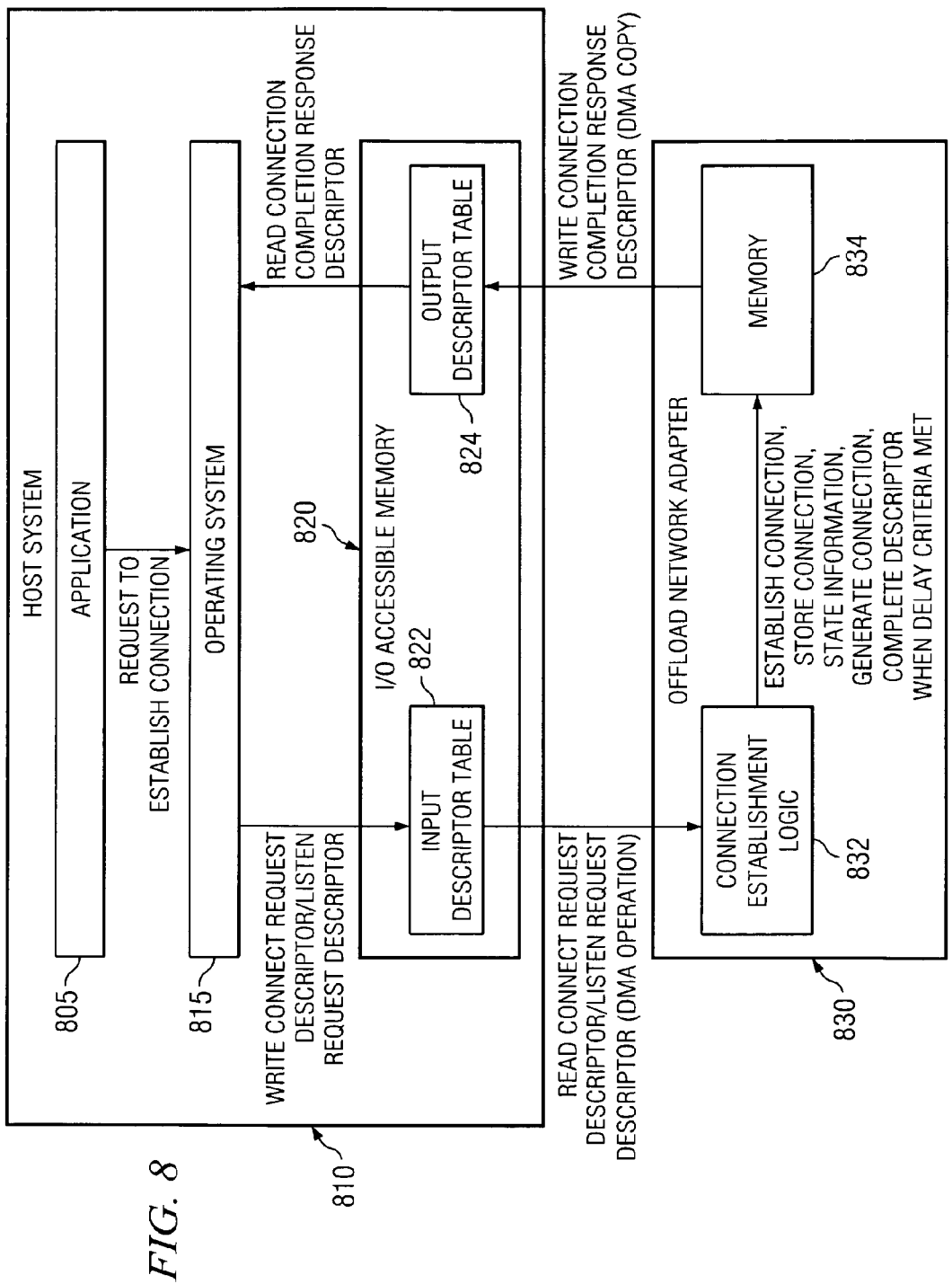
FIG. 8 is an exemplary diagram illustrating aspects of one exemplary embodiment of the present invention with regard to establishment of a connection using an offload network adapter and the Offload Network Adapter Programming Interface.

FIG. 8 is an exemplary diagram of the communication between host system and an offload network adapter when establishing a communication connection in accordance with one exemplary embodiment of the present invention. As shown in FIG. 8, establishment of an outbound connection is initiated by the receipt of a request from an application 805 by the operating system 815, requesting that a connection be established. As a result, the operating system 815 generates a connect request descriptor and writes it to the input descriptor table 822. The connect request descriptor and associated control buffer includes all of the information required to establish the requested connection. For example, the control buffer and connect request descriptor may contain AF_INET, SOCK_STREAM, IP VERSION information and connection identifiers to reference the remote and local connections.

The offload network adapter 830 reads the connect request descriptor from the input descriptor table 822 and then the connection establishment logic 832 within the offload network adapter 830 attempts to establish the connection based on the information received in the connect request descriptor. Establishment of a connection based on the connect request descriptor includes establishing a socket descriptor for the connection, i.e. a data structure describing the socket of the host system and the remote computing device, associating a connection identifier with the connection, and allocating a buffer in the offload network adapter 830 for the connection. That is, the offload network adapter may perform the operations associated with conventional system calls connect( ), setsockopt( ), bind( ), accept( ), and the like. Only when the connection is established, or an error condition is met, such as a duration time-out condition, is the host system 810 informed of the resulting status of the connection establishment operation.

This response may be the writing of one or more response descriptors to the output descriptor table 824. For example, a connection completion descriptor may be generated by the offload network adapter 830 and written to the output descriptor table 824 to thereby inform the host system 810 that the connection has been established.

Establishment of an inbound connection is performed in a slightly different manner. If an application requests the ability to "listen" for a connection on a specific port, the operating system 815 may write a listen request descriptor to the input descriptor table 822. The listen request descriptor identifies the port on which to listen and the protocol for which connections are to be listened for. The connection establishment logic 832 of the offload network adapter 820 then reads the listen request descriptor from the input descriptor table 822 and performs the necessary operations for establishing a connection on the appropriate incoming socket connection. This may include, for example, performing operations similar to the conventional accept( ) and bind( ) system calls, however, performing them within the offload network adapter 830. Only when the connection is established or an error condition is met (such as a duration time-out condition) is the host system 810 informed of the resulting status of the connection. In known "offload" implementations, the host system interacts at each stage of the connection establishment. The present invention issues a high level command to connect or listen for connections and only responds when a connection is established or a time-out or error condition is met.

When connections are established, information about the connections is maintained in a connection state data structure in the offload network adapter's memory 834. This state information is used to send and receive data over established connections. This state information may also be used to update connection state information maintained by the host system 810, as discussed hereafter.

As can be seen from the above description, one of the key results of performing the connection establishment operations within the offload network adapter and using the Offload Network Adapter Programming Interface of the present invention, communication between the host system and the network adapter is minimized during establishment of a connection. As a result, there are less messages for the host system to process. This is especially important when the host system is a server computing system with which great numbers of connections are established and torn down.

As mentioned above, in one embodiment of the present invention, the host system may be informed of the status of a connection after the connection is established or an error condition is encountered. Thus, as a result, a connection completion response descriptor is written to the output descriptor table 824 each time a connection is either established or the attempt to establish the connection fails. With the writing of each connection completion response descriptor to the output descriptor table 824, an interrupt may be generated and sent to the operating system 815 to inform the host system 810 that a new response descriptor is present in the output descriptor table 824 for processing.

In order to minimize the number of times a connection completion response descriptor is written to the output descriptor table 824, and thus, to minimize the number of interrupts generated and sent to the host system 810, the present invention may delay the writing of a connection completion response descriptor to the output descriptor table 824 in a number of different ways. The advantage of delaying the notice of connection establishment status to the host is the potential for aggregation of several connections in a single notification. In this way, a plurality of completion response descriptors for the same or different connections may be "batched" together and provided to the host system in one transaction between the offload network adapter and the host system.

For example, a configurable delay value may be set based on the rate of socket connections being established, the rate at which connection requests are received, or the like. This delay value may identify an amount of aggregation of connection establishment information that may be accumulated in an offload network adapter 830 memory before generating a connection completion response descriptor that designates the status of each connection within the aggregate. This value may be stored in memory on the offload network adapter 830.

The delay value may be statically or dynamically determined and may take the form of a predetermined amount of time between establishment of a connection and notification to the host system using the connection completion response descriptor, a number of connection establishment status updates received, i.e. success/failure of a connection establishment operation, or the like. If the delay value is dynamically determined, it may determined based on, for example, the rate or amount of connections received over a period of time, historical observation of socket connection timings, or the like. For example, if a specific socket receive connection has bursts of 10 connection requests over 10 milliseconds and then are quite for 10 seconds, it may be prudent to delay all notifications to the host system until 10 connections are made to reduce overall notifications to the host system. A timeout feature of 1 second may be used to wait for additional socket connections.

Another option for determining when to write a connection completion response descriptor to the output descriptor table 824 is for the offload network adapter 830 to wait unit data arrives of the established connection. In this way, the offload network adapter 830 maintains information about the established connection in memory until data is received for processing by the host system 810. At that time, a connection completion response descriptor may be written to the output descriptor table 824 informing the host system 810 of the establishment of the connection and then a buffer receive response descriptor may be written to the output descriptor table 824 indicating the receipt of data over the established connection.

In yet another embodiment of the present invention, the notification to the host system via the output descriptor table 824 may be delayed until a specific data pattern is received over a connection. These specific data patterns may be, for example, a specific HTTP GET request, a specific meta tag predetermined to indicate the end of a sequence of data that can be processed as a single unit, or the like.

Once this data pattern is received over an established connection, the offload network adapter 830 may write a connection completion response descriptor to the output descriptor table 824 identifying all the connections that were successfully established or failed during the time period until the data pattern was received. In this way, the host system 810 is not informed of establishment of the new connections until the host system 810 has specific data to process. In other words, the host system is not bothered with descriptors to process unless there is something specific for the host system to do. That "something" is defined by the data pattern that is being search for.

Thus, the present invention permits the aggregation of notifications of established connections or failures at establishing connections, so that the number of notifications sent to the host system is minimized. This lessens the amount of processing that must be performed by the host system and permits the host system to use its resources to handle the applications running on the host system.

With the present invention, since connection establishment is performed by the offload network adapter 830, the state of the established connections is maintained in the memory of the offload network adapter 830. However, it may be necessary for the host system 810 to have this state information in the event of a failover, network error conditions, or to make routing decisions. Thus, the present invention provides a mechanism for migrating the state information for the established connections maintained in the offload network adapter 830 to the host system 810.

In one exemplary embodiment of the present invention, a connection attribute response descriptor may be periodically generated and written to the output descriptor table 824. This connection attribute response descriptor identifies the current state of each of the connections. The host system 810 is informed of the addition of the connection attribute response descriptor to the output descriptor table 824 by sending an interrupt to the operating system 815. The host system 810 then reads the connection attribute response descriptor and processes it such that the host system's connection state information is updated. Thus, the host system 810 is provided with updated information by which the host system 810 may make routing decisions and perform appropriate operations in the event of a network error or failover.

Thus, the present invention provides mechanisms for offloading connection establishment to an offload network adapter such that communication between the host system and the offload network adapter during connection establishment is minimized. This may permit the host system to send bulk connection establishment requests to the offload network adapter in a single connect request descriptor and then no further communication with the host system is necessary by the offload network adapter until certain criteria are met, e.g., a predetermined number of connections is established, a predetermined amount of data arrives on a connection, a predetermined amount of time elapses, a predetermined data pattern is received, etc. Similarly, the host system may instruct the offload network adapter to listen for connections on a particular port and then accept and bind those connections. As a result, the host system may send one listen request descriptor and not be communicated with again until predetermined criteria are met with regard to establishment of connections on the port being listened to. In addition, the present invention provides a mechanism for storing the connection state information in the offload network adapter and then migrating this state information to the host for use in routing decisions and in the event of a network error or failover.

FIGS. 9 and 10 are flowcharts outlining operations of elements of the present invention in accordance with one exemplary embodiment of the present invention. It will be understood that each block of these flowchart illustrations, and the other flowchart illustrations described hereafter, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 9 is a flowchart outlining an exemplary operation of a host system of the present invention when establishing a connection using an offload network adapter. As shown in FIG. 9, the operation starts by receiving a connection establishment request from an application (step 910). This connection establishment request may be, for example, a request to establish a specific connection or a request to listen for connections at a particular port. A connection establishment request descriptor is written to an input descriptor table (step 920). This connection establishment request descriptor may be, for example, a connect request descriptor or a listen request descriptor.

The operation then waits for a response as to the completion of the connection establishment operation from the offload network adapter (step 930). By "waiting" what is meant is that no further operations are performed by the host system with regard to this connection until a response is received. Obviously the host system is performing other operations while this "waiting" is occurring.

A determination is made as to whether a response has been received (step 940). If not, a determination is made as to whether the connection establishment request has timed-out (step 950). If not, the operation returns to step 930 and continues to wait. If the connection establishment request has timed-out, a cancellation request descriptor is written to the input descriptor table (step 960) and the operation terminates.

If a response is received, a connection completion response descriptor is read from the output descriptor table (step 970). The connection completion response descriptor is then processed by the host system (step 980) and the operation terminates.

It should be noted that the original connection establishment request descriptor that is written to the input descriptor table in step 920 may designate a plurality of connections to be established, i.e. a bulk connection establishment request. Thus, with the present invention, the host need only make one transaction with the input descriptor table to perform this bulk connection establishment with all of the processing necessary for establishing these connections being offloaded to the offload network adapter. Similarly, if the original connection establishment request descriptor is a "listen" request descriptor, many connections may be established while the offload network adapter listens to the port, however only one transaction is performed by the host system to initiate the establishment of these connections.

FIG. 10 is a flowchart outlining an exemplary operation of an offload network adapter when establishing a connection in accordance with one exemplary embodiment of the present invention. As shown in FIG. 10, the operation starts by reading a connection establishment request descriptor from an input descriptor table (step 1010). Connection establishment operations are performed to generate socket descriptors, connection identifiers, and the like, to establish the connection(s) identified in the connection establishment request descriptor (step 1020). State information regarding each of the established connections is stored in memory along with information identifying which connections have been established and which connections have failed since a previous notification to the host system (step 1030).

A determination is made as to whether a delay criteria has been met for writing of a connection completion response descriptor (step 1040). As mentioned above, the delay criteria may take many different forms. For example, the delay criteria may be a number of connections established since a last notification sent to the host system, a predetermined amount of data arriving over one of the connections, a specified data pattern being received, a predetermined amount of time since a last notification to the host system, and the like.

If the delay criteria has not been met, then the operation returns to step 1020 and continues to establish connections with state information and connection establishment information being maintained in memory. If the delay criteria has been met, a connection completion response descriptor is generated and written to the output descriptor table identifying the connections established and connections that failed to be established since the last notification to the host system (step 1050). The operation then terminates.

Thus, the present invention provides an improved mechanism for establishing connections using an offload network adapter. This aspect of the present invention is especially well suited for bulk connection establishment in that the communication between the host system and the offload network adapter is minimized so that many connections may be established with only a minimum amount of interaction between the host system and the offload network adapter. This frees the host system to concentrate its resources on running applications and performing other useful work.

Memory Management

In addition to connection establishment, the present invention improves upon memory management in a data processing system that utilizes an offload network adapter. The memory management according to the present invention permits both buffered sending and receiving of data as well as zero-copy sending and receiving of data. In addition, the present invention permits grouping of DMA buffers that can be shared among specified connections based on any number of attributes. The present invention further permits partial send and receive buffer operation, delaying of DMA requests so that they may be communicated to the host system in bulk, and a mechanism for expedited transfer of data to the host system.

The Offload Network Adapter Programming Interface supports conventional user-level application program interfaces (APIs) such as the socket interface as well as newer APIs that allow more direct access to user memory. The offload architecture of the present invention permits both buffered sending and receiving of data as well as zero-copy sending and receiving of data. From the offload network adapter's viewpoint, the buffered and zero-copy transmissions are handled almost identically. The manner in which these two types of data transfers are distinguished is based on how the host system utilizes the offload network adapter.

FIG. 11 is an exemplary diagram illustrating a memory management mechanism in accordance with the present invention in which buffered sending and receiving of data is utilized. It is assumed, for purposes of this description, that a connection between the host system 1110 and another computing device (not shown) has been established through the mechanisms discussed above. When a read( ) call is made referencing this connection, an application buffer 1130 may be established for this connection. The operating system 1150 may further include a pinned kernel buffer 1140, which may be referred to as a bulk buffer that receives data for a variety of connections, into which data is written before sending to a network adapter or to a particular connection buffer, e.g., application buffer 1130. The kernel buffer 1140 is created at connection issue time and is used when no application buffer 1130 for a connection is posted before data is sent on the connection. If an application buffer 1130 is posted before data is sent, the application buffer may be used to receive the data. Alternatively, as discussed hereafter, both the application buffer 1130 and the kernel buffer 1140 may be used in some buffered transmission embodiments.

As shown in FIG. 11, when a host system 1110 wishes to send data to another computing device via the offload network adapter 1120, the host system 1110 copies the data from an application buffer 1130 in user space to the pinned kernel buffer 1140 of the operating system 1150 in the operating system kernel space. This pinned kernel buffer 1140 is a bulk buffer that receives data from the offload network adapter 1120 and from application buffers 1130 for one or more established connections. Thus, the host system 1110 may have a plurality of application buffers 1130, if a plurality of connections are currently open, and data for these connections may be transmitted/received via the pinned kernel buffer 1140.

In this way, the data is queued for transmission by the offload network adapter 1120. The host system 1110 may then post a buffer send descriptor on the input descriptor table identifying the pinned kernel buffer 1140 as having data for sending. The offload network adapter 1120 may then, in response to reading the buffer send request descriptor from the input descriptor table, read the data from the pinned kernel buffer 1140 and may transmit the data over the network (not shown) to the destination computing device. Thereafter, the offload network adapter 1120 may post a buffer available response descriptor on the output descriptor table indicating that the transmission of the data has completed. Thus, with sending of data using a buffered transmission mechanism, the present invention copies data from the application buffer 1130 to the pinned kernel buffer 1140 for transmission.

Buffered receives work in a similar manner. With a buffered receive operation, the offload network adapter 1120 performs a direct memory access (DMA) operation to transmit the data from the offload network adapter 1120 into the pinned kernel buffer 1140. In response to a buffer available request descriptor being posted by the host system 1110 on the input descriptor table, the offload network adapter 1120 may post a buffer receive response descriptor on the output descriptor table. The host system 1110 may then read the buffer receive response descriptor from the output descriptor table and may call the read( ) socket call to copy the data from the pinned kernel buffer 1140 to the application buffer 1130 in user space.

Buffered transfers tend to be slower than optimal because of the number of data copy operations that must be performed to transfer the data from the application buffer 1130 to the pinned kernel buffer 1140 or vice versa. However, buffered transfers provide two advantages. Because the data is kept in the host kernel memory, i.e. in the pinned kernel buffer 1140, memory pressure is reduced on the offload network adapter 1120 since buffers need not be DMA'd to the offload network adapter 1120 until they are about to be sent. In addition, fail-over is easier to accomplish since, if the offload network adapter 1120 fails, the data is still available in the host system's pinned kernel buffer to be sent via another network adapter.

The architecture of the present invention further provides a mechanism for zero-copy transmission of data between the offload network adapter and the host system. The term "zero-copy" refers to the elimination of memory-to-memory copies by the host system. FIG. 12 is an exemplary diagram illustrating a zero-copy operation in accordance with one exemplary embodiment of the present invention. For transmitting data to/from the host system 1210, the host system 1210 may block a user application and pin its application buffer 1230. The host system 1210 may then invoke the offload network adapter 1220 to DMA the data directly to/from the application buffer 1230 to the offload network adapter 1220.

In current systems, to read from an established connection, an application calls the read( ) socket call with three arguments. The first argument specifies the socket descriptor to use, the second argument specifies the address of the application buffer 1230, and the third argument specifies the length of the buffer. A read extracts data bytes that have arrived at that socket and copies them to the user's buffer area, e.g. application buffer 1230. If less data has arrived than fits into the user's buffer area, read( ) extracts all the data and returns the number of bytes it found.

With zero-copy in the system according to the present invention, the creation of an application buffer 1230, i.e. a DMA buffer, causes a descriptor communication packet to be generated and sent from the host system 1210 to the offload network adapter 1220 e.g., a buffer available request descriptor communication packet may be generated and posted to the input descriptor table. The descriptor describes the application buffer 1230, its attributes, and associates the application buffer 1230 with connection information for the established connection. When the application buffer is available to the offload network adapter 1220, and when a read( ) socket call is performed, a DMA operation is performed to transfer the data from the offload network adapter 1220 to the application buffer 1230. A response descriptor from the offload network adapter 1220 is then created describing the DMA data attributes required for the read( ) call completion notification, e.g., a buffer available response descriptor may be generated and posted to the host system's input descriptor table.

It should be noted that the offload network adapter 1220 maintains information for each open connection in memory for use in performing its functions. This information may include identification of the application buffers associated with the open connections as well as other connection specific information. This information is then used when the offload network adapter 1220 needs to communicate data between itself and the applications on the host system 1210.

Thus, with the present invention, the offload network adapter may send data directly to an application buffer in user space using a direct memory access operation. In so doing, the copying of data from a pinned kernel buffer to the application buffer is avoided. Of course, the present invention may operate in either mode, i.e. buffered send/receive or zero-copy send/receive, or may use both modes interchangeably or at approximately the same time. That is, some data may be transferred between the host system and the offload network adapter using buffered send/receive and other data may be transferred using zero-copy send/receive. For example, the zero-copy send/receive may be used whenever the application read( ) call preceeds the reception of respective data on a socket. In this way, an application buffer will be pre-posted for receiving data on the established connection. If the read( ) call does not preceed the reception of data on the socket, then the buffered send/receive may be used.

In a preferred embodiment, zero copy send/receive is a preferred manner of sending/receiving data to/from the host system. However, situations may arise in which zero copy send/receive is not possible. For example, if an application buffer's available memory is going to be exceeded or if an application buffer is not available, the offload network adapter may not be able to send data directly to the application buffer using a direct memory access operation. As a result, buffered sending of the data to a shared buffer may be required.

The offload network adapter of the present invention has the ability to group application buffers that can be shared among specified connections based on any number of attributes. In a preferred embodiment, the grouping of application buffers is based on the connection port number. That is, application buffers that all use the same port number may share application buffers. For example, in web serving scenarios, there may be multiple connections per port. An example is the TCP/IP port 80 of a web server. There may be thousands of client HTTP connections requesting information over port 80. The buffers allocated to port 80 may be grouped, i.e. a pool of allocated buffers may be established, in order to handle these information requests coming in on port 80.

Sharing the application buffers on send operations allows reuse of data for host system based broadcast or multicast type connections. That is, the data need only be written to the shared application buffers once, but may be transmitted over a plurality of connections that share those application buffers. Sharing the application buffers for received data allows for more efficient use of memory for active connections that have low bandwidth requirements or transient bursts of traffic. That is, multiple connections may share a smaller shared application buffer than having to have their own dedicated individual application buffer in which much of the memory for the buffer may go unused with low bandwidth or transient burst connections. In addition, sharing application buffers allows separate applications and processes to share the data that is received.

Figure 13:
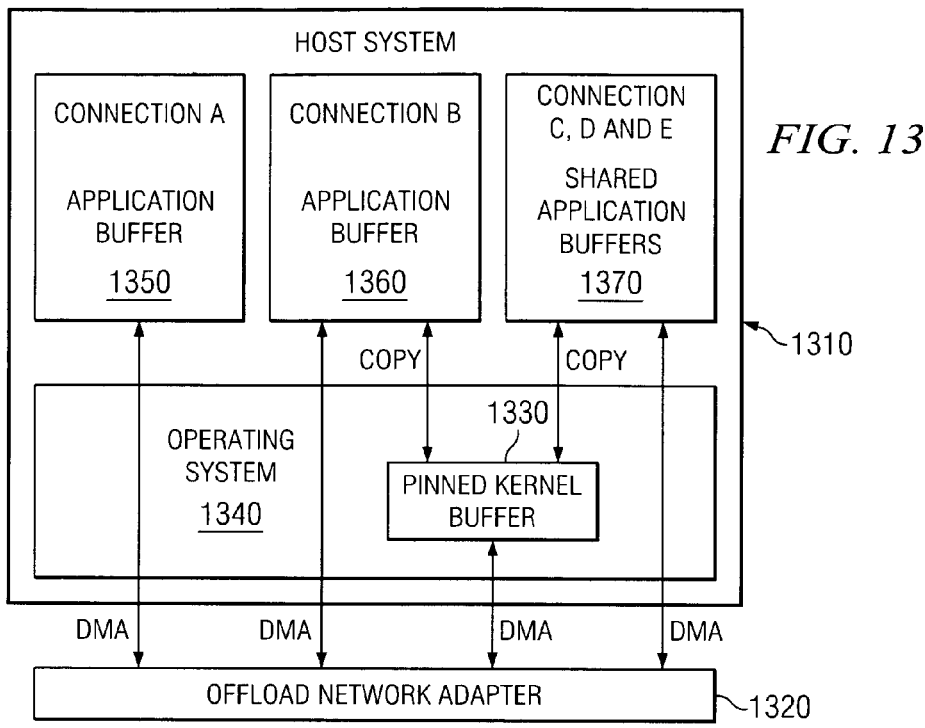
FIG. 13 is an exemplary diagram illustrating a shared buffer arrangement according to one exemplary embodiment of the present invention.

FIG. 13 is an exemplary diagram illustrating a shared buffer arrangement according to one exemplary embodiment of the present invention. In the depicted example, three processes X, Y and Z are currently running on host system 1310. Five connections A, B, C, D and E have been established and corresponding application buffers 1350-1370 have been established in host system 1310 memory for these connections. Application buffers 1350 and 1360 are individual application buffers into which data may be sent directly using a DMA operation. Alternatively, data may be copied into these application buffers 1350-1360 using pinned kernel buffer 1330 as part of a buffered send/receive operation, as discussed above.

Application buffers 1370 are shared application buffers that are shared between connections C, D and E. For example, connections C, D and E may all use the same port number for their socket connections, may be low bandwidth connections, and thus, may share buffer space. Alternatively, connections C, D and E may be part of a multicast or broadcast group that is to share the buffers 1370 for multicasting or broadcasting of data.

As shown in FIG. 13, when a buffered send/receive transfer of data is utilized, data is first sent, using a DMA operation, from the offload network adapter 1320 to the pinned kernel buffer 1330 in the operating system 1340 of the host system 1310. In response to the host system 1310 posting of a buffer available request descriptor in the output buffer table, the offload network adapter 1320 posts a buffer receive response descriptor in the input descriptor table. The host system 1310 may then call read( ) to copy the data from the pinned kernel buffer 1330 to the shared application buffers 1370 for connections C, D and E. From these shared application buffers 1370, data may be read in by one or more processes that share the shared application buffers 1370. For example, process Z may read in data from the shared buffers 1370. Any process that listens for data on connections C, D or E may perform these operations to read-in data on its connection from the pinned kernel buffer 1330 to the shared buffers 1370.

Alternatively, as with the individual application buffers 1350 and 1360, data for connections C, D and E may be direct memory accessed into the shared buffers 1370 directly from the offload network adapter 1320. In this way, a zero copy implementation of the present invention may make use of shared buffers 1370 to hold data for sending/receiving from a plurality of connections.

One instance in which the shared buffers 1370 is especially useful is when the offload network adapter 1320 needs to DMA data to the host system 1310 memory before the application has established an application buffer in which to receive the data. For example, this may occur when data continues to be received on the offload network adapter 1320 beyond a predetermined threshold and the offload network adapter could be in danger of running out of memory. Given that such a scenario may exist, an intermediate copy of the data into the shared system buffers 1370 in host memory would aid in alleviating this situation. That is, data may be copied into a shared buffer 1370 for all of the open connections rather than a dedicated connection application buffer, such as buffer 1350.

Thus, in addition to the advantages associated with zero copy data transfers between the host system and the offload network adapter, the present invention also provides a mechanism by which connections may share buffers in order to minimize the amount of host system memory used by connection buffers, provide a mechanism for handling data in the event of the offload network adapter memory overflowing, and to avoid unused host system memory allocated to dedicated connection buffers.

In addition to the above memory management mechanisms, the present invention also provides for partial receive and send buffers for established connections. The "partial receive and send buffers" functionality of the present invention refers to the ability of the present invention to append receiving data to a buffer that has already received/sent data for the application. The buffer is reused for the application data transfer rather than two separate buffers being allocated.

Figure 14:
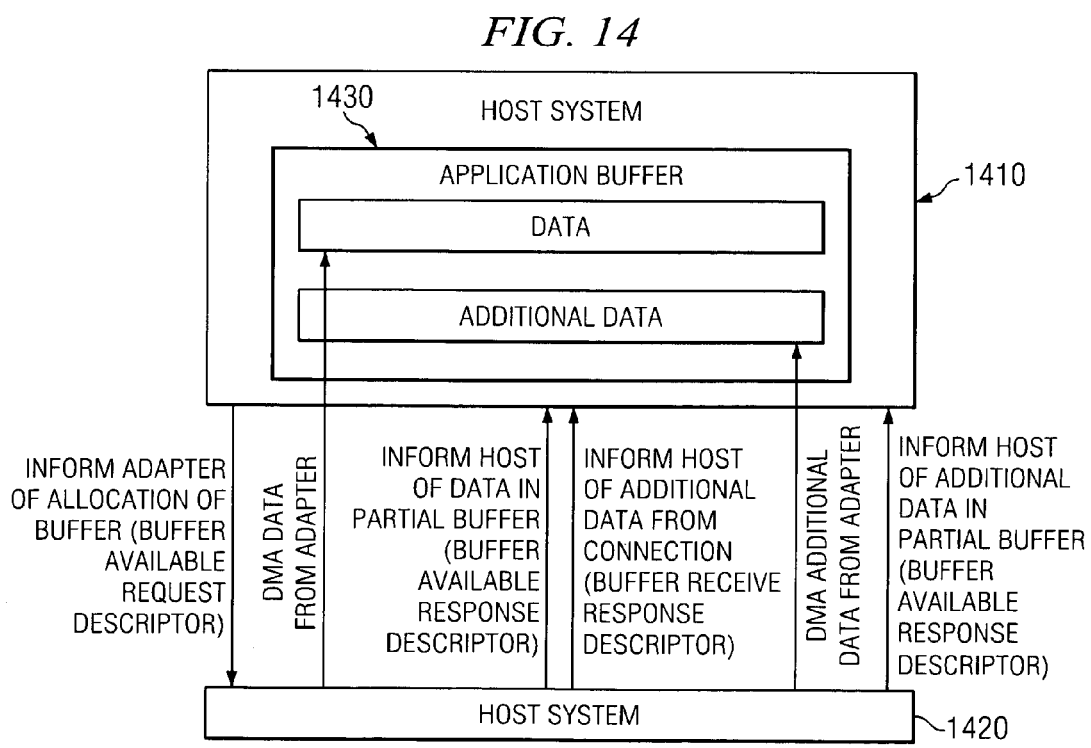
FIG. 14 illustrates the manner by which partial receive/send buffers operate in accordance with one exemplary embodiment of the present invention.

FIG. 14 illustrates the manner by which partial receive/send buffers operate in accordance with one exemplary embodiment of the present invention. With partial receive/send buffers, the host system 1410 informs the offload network adapter 1420 of the application buffer 1430 being allocated for a particular connection. For example, a buffer available request descriptor may be posted to the input descriptor table. In this way, the host system 1410 hands over ownership of the application buffer 1430 to the offload network adapter 1420.

The offload network adapter 1420 then receives data over the connection and DMA's the data to the application buffer 1430 on the host system 1410. The offload network adapter 1420 may then post a buffer receive response descriptor in the output descriptor table. In the depicted example, the data that is direct memory accessed to the application buffer 1430 is only enough to partially fill the application buffer 1430.

Upon informing the host system 1410 of the data's arrival in the application buffer 1430, the network interface hands control of this "partial" application buffer 1430 over to the host system 1410. Any remaining part of the initial buffer is still under control of the offload network adapter 1420. The semantics of the Read( ) call requires the addition of an "Byte Offset" value in a response. The application in the host system 1410 will know full control of the application buffer 1430 is returned to the host system 1410 when the Offset+Length of data returned equals the total length of the original application buffer 1430. If the Offset+Length of the data does not equal the total length of the original application buffer 1430, then the offload network adapter 1420 still maintains partial control of the buffer. Alternatively, an additional field can be provided that indicates a final transfer of data for the application buffer 1430. If this is the final transfer of data for the application buffer 1430, then control has been returned to the host system 1410 and the offload network adapter 1430 does not maintain partial control of the application buffer 1430.

Thereafter, if additional data is received over the connection, the offload network adapter 1420 may then DMA this additional data into the same application buffer 1430 on the host system 1410 such that the data is appended in the application buffer 1430. The host system 1410 is then informed by the offload network adapter 1420, such as through the posting of another buffer receive response descriptor in the output descriptor table, that additional data has arrived for the connection.

With such a mechanism as described above, fragmentation may be an issue if network packet sizes do no equal host memory buffer sizes. However, in the case where a large contiguous virtual buffer is provided for application use, buffer fragments may be used in order to preserve virtual contiguous space preferences. This saves the application from the added chore of concatenating buffers on virtual memory.

Consider, for example, an application Read( ) call that provides a 4 megabyte application buffer for data to be transferred to. This could be in anticipation of receiving a large data file or multimedia stream for display, for example. The offload network adapter can return 1500 byte portions of this data directly to the application buffer as they are received from the network. This arrangement allows this data to be received in contiguous virtual (application) space saving additional complexity of reassembly of the data on the application side.

On the other hand, the offload network adapter 1420 may elect to allow fragmentation when the application buffers are not part of a large contiguous virtual buffer to optimize placement of received data. Permitting fragmentation may help to reduce the number of buffers handed from the offload network adapter 1430 to the host system 1410 and vice versa. Thus, in addition to permitting zero copy transfers of data, buffered transfers of data, and shared buffers, the present invention further provides a mechanism for reuse of partially filled buffers so as to minimize the number of buffers allocated for use by connections.

As described above, the manner by which the offload network adapter communicates and transfers data between itself and the host system is through DMA operations. As with the establishment of connections, the offload network adapter may delay these DMA operations when transferring data to/from the offload network adapter and the host system so that bulk transfers of data may be accomplished. That is, the offload network adapter does not necessarily initiate DMA requests as soon as the host system requests a data transfer. When the offload network adapter deems it appropriate, the offload network adapter may decide when DMA operations are to be initiated on transmitted data.

For example, the offload network adapter may delay DMA operations for transferring data over a connection if it already has sufficient data in the memory of the offload network adapter to send over that connection. The offload network adapter may determine what constitutes a "sufficient" amount of data based on various criteria, for example, a current estimate of a product of the bandwidth and the delay, a congestion window, memory available on the offload network adapter, and the like. The offload network adapter may also make decisions based on other possible criteria such as fair queuing, quality of service associated with applications associated with the connections, differentiation of services, and the like.

For example, consider the case where an application Read( ) call provides a 4 megabyte buffer for data to be transferred to. The offload network adapter can return 1500 byte portions of this data directly to the buffer as they are received from the network. The offload network adapter can recognize that the application provided a very large buffer in anticipation of a bulk data transfer and may then batch multiple 1500 byte packets received from the network in anticipation of receiving additional packets. The number of 1500 byte packets in a bulk transfer would be a function of the characteristics of the connection between the host system and the offload network adapter. As an example, newer technologies such as PCI-Express can move larger blocks of data, say 64K, more efficiently that earlier PCI 2.1 bus interconnects.

As previously mentioned, when data is placed in an application buffer for sending, a buffer send request descriptor may be posted to the input descriptor table. This buffer send request descriptor may include an as soon as possible (ASAP) bit that indicates whether the sending of the data is to be expedited or not. The setting of the ASAP bit may further be a criteria utilized by the offload network adapter in determining if and by how much a DMA operation should be delayed. Of course, whenever possible, the offload network adapter should attempt to honor the host system's request for expedited transmission of data through the setting of this ASAP bit.

DMA operations tend to have a fixed setup cost as well as a per-byte transfer cost, in terms of processor cycles, required memory resources, and the like. In order to make better use of the I/O bus and reduce setup costs relative to per-byte costs, the offload network adapter may aggregate DMA transfers by recognizing that two requests for DMA transfers are for adjacent regions of physical memory. The host system may try to encourage this process by, for example, allocating large application buffers per connection, filling in subsets of the application buffers incrementally, and generating requests for the adjacent subsets of memory accordingly. The offload network adapter may recognize the subsets as adjacent and aggregate the DMA transfers.

As an example, the descriptor queue contains detailed information of address and length for DMA transfers. An inspection of adjacent descriptors prior to performing a DMA operation may show that the following DMA request is simply a continuation of the current request, i.e. is directed to an adjacent portion of memory. In this case both DMA transfers can be satisfied with a single, combined request that references both DMA operations that need to be made. This reduces the overhead of handling DMA transfer requests between the host system and the offload network adapter by providing bulk notifications of these DMA transfers.

The present invention may "store up" DMA data transfers until a sufficient number of DMA data transfers is present. The criteria for determining "sufficient" may vary as discussed above. Once a sufficient number of DMA data transfers are ready for execution, the present invention uses a priority mechanism for determining the order by which these DMA data transfers are to occur. Thus, in one exemplary embodiment of the present invention, DMA operations are reordered by the offload network adapter based on a priority mechanism so that preference may be given to starved connections and to high priority connections.

Figure 15:
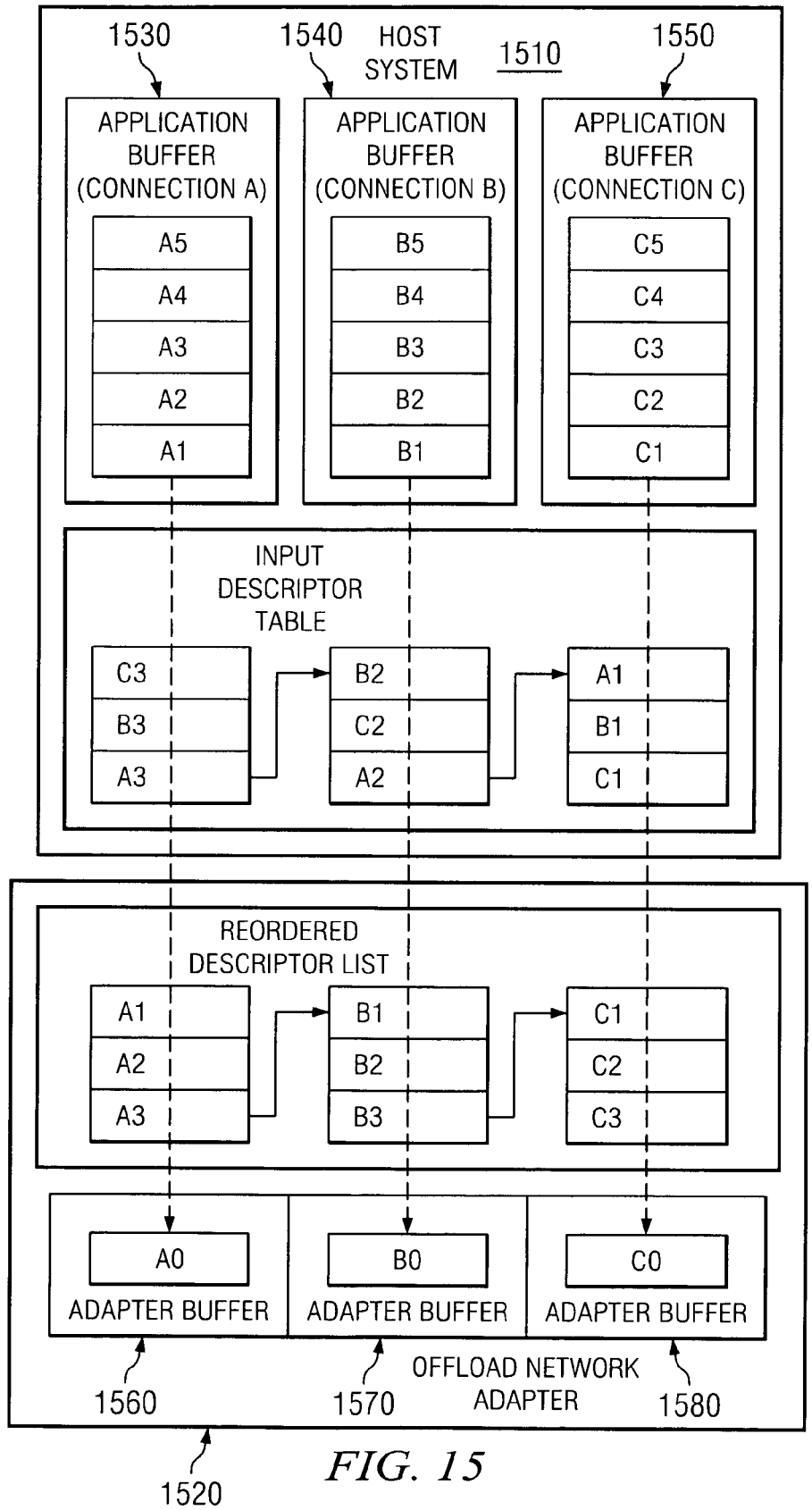
FIG. 15 illustrates an exemplary DMA transfer order decision making process in accordance with one exemplary embodiment of the present invention.

FIG. 15 illustrates an exemplary DMA transfer order decision making process in accordance with one exemplary embodiment of the present invention. As shown in FIG. 15, three connections have been established, connections A, B and C. These connections have been given a semantic priority ordering of A, B and C with A being the highest or preferred connection. This priority ordering may be determined for example, based on priorities assigned to applications or application connections by a user or the host system. As mentioned previously, the offload network adapter may store information regarding established connections. This priority information may be stored as part of the connection information in the offload network adapter and may be replicated, along with the rest of the connection information, on the host system. In this way, the priorty information is made available to both the offload network adapter and the host system for use in determining ordering of DMA operations.

At the depicted time, all connections have sufficient data on the offload network adapter 1520 to send over the connections A, B and C. The determination that needs to be made is to the order in which data should be direct memory accessed from the application buffers 1530, 1540 and 1550, to the offload network adapter buffers 1560, 1570 and 1580 for transmission.

With the present invention, bulk transfers of data are facilitated by storing groups of descriptors in the input descriptor table 1590 describing send operations and addresses for which the application buffers 1530-1550 that are available to send data. The offload network adapter reorders the list of descriptors in the input descriptor table 1590 based on the designated priorities of the connections.

The reordering of the list of descriptors, in one exemplary embodiment, is initially performed based on currently data starved connections. That is, if a connection is data starved, i.e. data has not been transmitted over the connection for a predetermined period of time, then descriptors associated with data for transmission over such a connection is ordered first in the list of descriptors. Thereafter, descriptors are reordered based on the priorities associated with the connections.

Thus, in accordance with the depicted example, the input descriptor table entries 1590, i.e. the buffer send request descriptors for connections A, B and C, will be read and reordered by the offload network adapter 1520 so that the reordered list of descriptors has the following order: A1, A2, A3, B1, B2, B3, C1, C2, C3. The data will then be read in from the application buffers 1530-1550 in this order and stored in the offload network adapter buffers 1560-1580 such that priority is given to connection A.

Thus, the present invention further provides a mechanism for bulk transfers of data using application buffers, buffer send request descriptors, an input descriptor table, and DMA operations between the host system and the offload network adapter. In this way, DMA operations may be delayed so that they may be performed in bulk rather than piecemeal interruptions of the applications running on the host system.

FIG. 16 is a flowchart outlining an exemplary operation when sending data using a host system and offload network adapter in accordance with aspects of one exemplary embodiment of the present invention. As shown in FIG. 16, the operation starts with a request to transmit data being sent to the operating system by an application (step 1610). The data is then copied from an application buffer to a pinned kernel buffer (step 1620). A buffer send descriptor is then posted to the input descriptor table (step 1630).

The offload network adapter then, through a DMA operation, reads the next entry in the input descriptor table (step 1640). It is assumed for purposes of this description that the next entry is the buffer send descriptor. The input descriptor table is stored in a bulk transfer list (step 1650) and a determination is made as to whether a delay criteria has been met (step 1660). If not, the operation returns to step 1640 to read the next entry in the input descriptor table. However, if the delay criteria has been met, the bulk transfer list is reorganized based on a determination as to whether any of the connections have been starved and connection priority (step 1670).

As mentioned above, as part of this determination, it may be determined whether the buffer send descriptor indicates that an ASAP bit has been set. If so, the delay criteria is determined to have been met and the transmission of the data is performed immediately, if possible.

Thereafter, the data is read from the pinned kernel buffer, via a DMA operation, and is transmitted by the offload network adapter in the order determined from the reorganization of the bulk transfer list (step 1680). A buffer available response descriptor may then be posted to the output descriptor table which is then read in by the host system to acknowledge sending of the data by the offload network adapter (step 1690). The operation then terminates.

FIG. 17 is a flowchart outlining an exemplary operation when performing a zero copy transfer of data between a host system and an offload network adapter in accordance with aspects of one exemplary embodiment of the present invention. As shown in FIG. 17, the operation starts by receiving data in the offload network adapter over an established connection (step 1710). The offload network adapter then posts a buffer receive response descriptor to the output descriptor table (step 1720). The host system reads the next entry in the output descriptor table (step 1730). It is assumed for purposes of this description that the next entry in the output descriptor table is the buffer receive response descriptor. The output descriptor table entry may then be stored in a bulk transfer list (step 1740).

A determination is made as to whether a delay criteria has been met (step 1750). If not, the operation returns to step 1730. If the delay criteria has been met, then the bulk transfer list is reordered based on whether or not a connection has been starved and connection priorities (step 1760). The data is then transferred directly to the application buffers associated with each connection for which there is data, in the order determined from the reordering of the bulk transfer list, using DMA operations (step 1770). The host system may then post a buffer available response descriptor to the input descriptor table for each DMA operation that is completed (step 1780). The operation then terminates.

It should be appreciated that the application buffers to which data is sent using DMA operations may include one or more shared application buffers. Thus, data received for various connections that share the one or more shared application buffers may be direct memory accessed into the shared application buffers and the applications may retrieve the data from the shared application buffers. This is true for the data send operation described in FIG. 16 as well, i.e. the application buffer from which the data is sent may be a shared application buffer.

Thus, the present invention provides mechanisms for sharing application buffers, delaying communication between the host system and the offload network adapter such that bulk transfers of data may be achieved, and zero copy transfers of data between the host system and the offload network adapter. In addition, the present invention provides a mechanism for partial buffer data transfers such that data may be transferred to the same application buffer that already has had data transmitted to it.

Handling Received Data

In addition to connection establishment and memory management, the present invention improves upon the handling of received data in a data processing system that utilizes an offload network adapter. As discussed above, the offload network adapter of the present invention may include logic that permits the offload network adapter to delay notification of data reception to the host system in different ways. The advantage of delaying the notice of data packet reception to the host system is the potential for aggregation of several data packets, which can arrive immediately after the first one, for example, in a single notification. Given a stream with continuous data packet arrival, a value may be set for notification delay and this value may be configurable for the host system per communication socket.

The delay value may be set statically or dynamically. For example, the delay value may be set based on the rate or amount of data received over a period of time through historical observation of data received in the socket connection. An example may be that if a specific receive connection operates in bursts of 10 packets of data over 10 milliseconds that then are quite for 10 seconds, it may be prudent to delay all notifications of packet arrivals for 10 milliseconds to reduce overall notifications to the host system.

Alternatively, the rate at which the host system is posting application buffers to connections may be monitored and used as a basis for dynamically setting this delay value. If the host posts application buffers at a specific rate, e.g., once every 10 milliseconds, it would make sense to delay data arrival notifications by 10 milliseconds to insure a buffer is available for zero copy transfer of data from the offload network adapter to the host system.

As a further alternative, the rate at which the host system posts new buffers for a connection after a data arrival notification has been sent to the host system may be monitored and used as a basis for setting the delay value. This indicates the rate at which the host system consumes data from a particular connection. For example, it may take 10 milliseconds for the host system to consume data within a buffer and to post the buffer to the offload network adapter for use. Thus, a notification delay of 10 milliseconds might be prudent to insure the replacement of a data buffer for zero copy transfers of data between the offload network adapter and the host system.

In yet another alternative embodiment, the amount of data may be used rather than a time metric for buffer reception posting delay. In this case, the delay value is set to wait for a certain amount of data to be received before notifying the host system of reception of the data packets. The amount of data can be set statically by the host system as an option in the set-up of the connection or dynamically by the offload network adapter based on historical observation. Other methods and mechanisms for determining the setting of a delay value may be used without departing from the spirit and scope of the present invention.

Regardless of which alternative embodiment is chosen for determining the amount of the delay, a maximum delay value may be maintained in the offload network adapter for identifying a maximum delay between a first data arrival and eventual notification of the data arrival to the host system. This insures that there are no excessive delays between arrival of data and notification of the arrival of data to the host system. The delay value, maximum delay value, and the other information necessary for determining the delay value may be stored in memory on the offload network adapter for use in setting the delay value and for determining how long to delay notifications to the host system from the offload network adapter.

In the previous descriptions of the operation of the present invention, the delay value determined according to one or more of the alternatives discussed above, and the maximum delay value, are utilized in determining if delay criteria are met. For example, when determining if a delay criteria is met, a comparison of the timing delay from the receipt of a first data packet may be compared to the delay value. Once the timing delay meets or exceeds the delay value, a bulk transfer of data packets may be made from the offload network adapter to the host system, or vice versa. Similarly, if the delay value is presented in terms of an amount of data, the amount of data received over connections from a first data packet having been received may be compared to the delay value to determine if the amount of data meets or exceeds the amount of data set in the delay value. If so, a bulk transfer of the data from the offload network adapter to the host system, or vice versa, may be initiated through a bulk data receive notification being sent to the host system or offload network adapter, e.g., a buffer receive response descriptor being posted to either the input or output descriptor tables.

In current non-intelligent host-network adapter systems, all data passes through a pool of non-connection specific application buffers in the host's operating system layer. Given that zero copy transfers of data to connection specific application buffers are possible using the mechanisms of the present invention, the present invention provides a decision process for the case when no connection specific application buffer or shared application buffer has been currently posted by the application to receive data. By default, if a connection specific application buffer or shared application buffer has not been allocated to the connection, the decision process of the present invention transfers the data from the offload network adapter to the application using a buffer from a pool of non-connection specific application buffers.

However, with the present invention, a host system provided configuration parameter may be provided such that if no connection specific buffer exists, then the offload network adapter may wait until a connection specific application buffer is allocated rather than using the non-connection specific application buffers. This parameter may be stored in the memory of the offload network adapter and may be used to override the default behavior of the system so that the offload network adapter waits until a connection specific application buffer is allocated for the connection before data is direct memory accessed to the host system. This waiting may be done until either the connection specific application buffer is allocated or a maximum wait time is met or exceeded. If the maximum wait time is met or exceeded, the data stored in the offload network adapter for the connection may be direct memory accessed to a non-connection specific application buffer.

Rather than setting a predefined host provided configuration parameter to override the default behavior of using the non-connection specific application buffers, the offload network adapter itself may be provided with logic that permits it to determine, based on historical data of the host system supplying connection specific application buffers, whether to wait for a connection specific application buffer, how long to wait for a connection specific buffer, or to not wait for a connection specific application buffer.

For example, a host system may have provided connection specific application buffers for zero copy operations 100% of the time in the time frame observed in the historical data. That is, in the last x number of data transfers, a connection specific application buffer was utilized 100% of the time to facilitate these data transfers. As a result, the above operation of waiting for a connection specific application buffer may be performed.

However, if the historical data indicates that the data transfers were not performed 100% of the time using a connection specific application buffer, a determination is made as to whether the percentage of times a connection specific application buffer was utilized is less than a predetermined threshold amount. If so, then the offload network adapter may not wait for a connection specific application buffer to be allocated and may make use of the non-connection specific application buffers. Alternatively, the amount of time that the offload network adapter waits for a connection specific application buffer may be reduced based on whether the percentage value falls below the predetermined threshold. As data transfers continue, the historical data maintained within the offload network adapter may be a time window that moves along with each data transfer. Thus, as more data transfers are performed using connection specific application buffers, the percentage value may increase to above the predetermined threshold and the system may return to waiting for connection specific application buffers to be allocated or to the original wait time for a connection specific application buffer.

In another aspect of an exemplary embodiment of the present invention, if a non-connection specific application buffer must be selected from the pool for use in DMA'ing data from the offload network adapter to the host system, the present invention provides logic within the offload network adapter for selecting a non-connection specific application buffer to which to send the data. This logic looks at each of the characteristics of the various non-connection specific application buffers in the buffer pool and selects the one that provides a best match for the data that is to be transferred from the offload network adapter to the host system. The information about the buffers may be obtained from the connection information maintained in the host system and/or the offload network adapter.

For example, when the offload network adapter determines that it must use a non-connection specific application buffer from the buffer pool, the offload network adapter reads in characteristic information for the buffers in the pool from the host system. This characteristic information may be, for example, the size of the buffer, speed of the buffer, placement of the buffer in the host processor architecture, etc. Based on these characteristics, the offload network adapter selects a buffer from the pool that is a best candidate for use in transferring the data from the offload network adapter to the host system.

Taking, as an example, buffer size as the characteristic to which the selection process is keyed, there may be several non-connection specific application buffers available in the buffer pool having different sizes. Given that a certain amount of data is to be transferred to the host system, the offload network adapter would select a non-connection specific application buffer from the buffer pool that has sufficient size to wholly contain the data rather than spreading the data over a plurality of buffers. The other characteristics mentioned above may be used in a similar manner to determine the best buffer to use for the particular data transfer.

Figure 18:
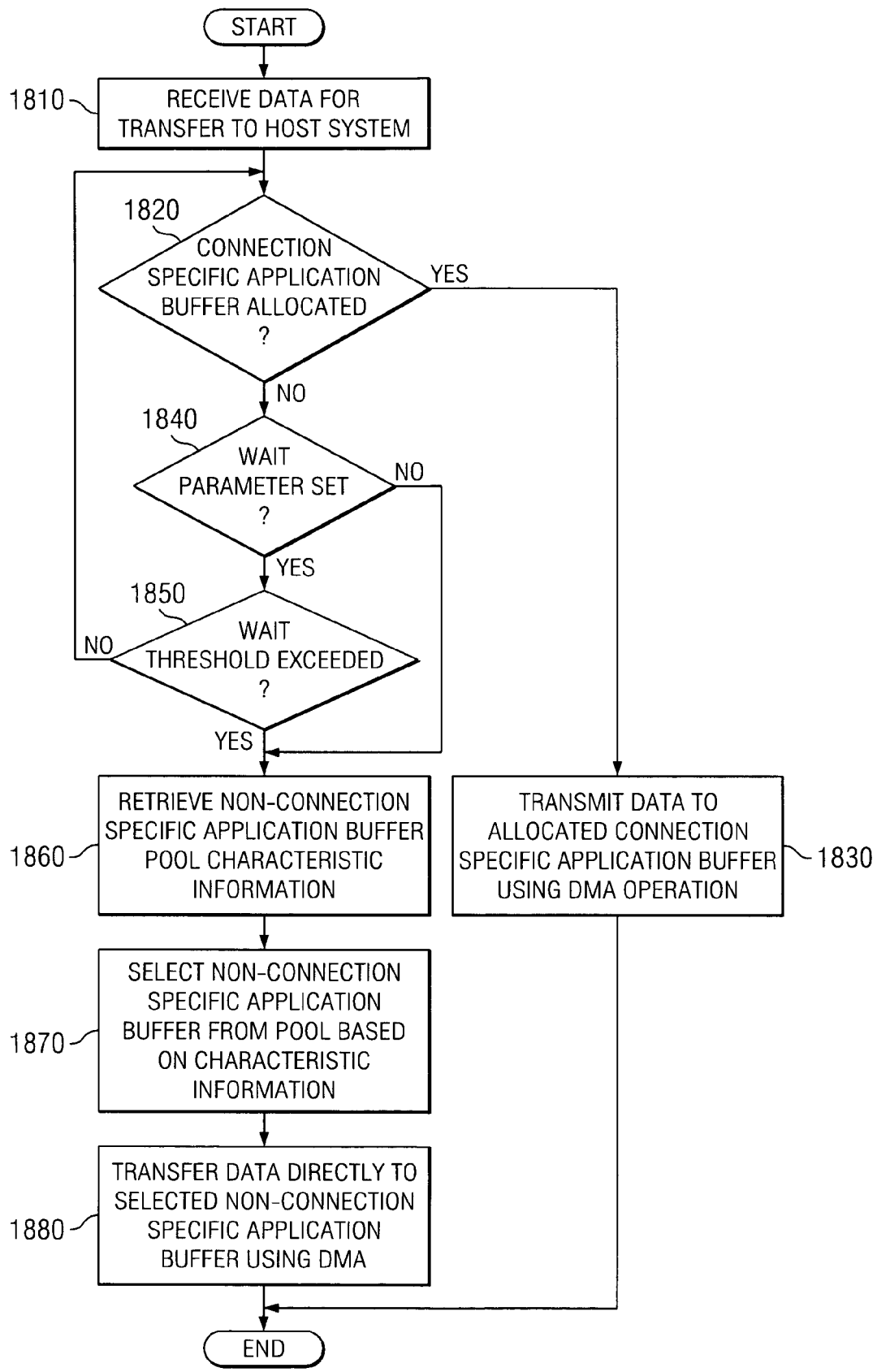
FIG. 18 is a flowchart outlining an exemplary operation for determining an application buffer to send data to in accordance with aspects of one exemplary embodiment of the present invention.

FIG. 18 is a flowchart outlining an exemplary operation for determining an application buffer to send data to in accordance with aspects of one exemplary embodiment of the present invention. As shown in FIG. 18, the operation starts by receiving data in the offload network adapter for transfer to the host system (step 1810). A determination is then made as to whether a connection specific application buffer is allocated for the connection(s) to which the received data is directed (step 1820). If so, then the data is transmitted to the allocated connection specific application buffer(s) using DMA operations (step 1830) and the operation terminates.

If a connection specific application buffer is not allocated for a connection to which data is directed (step 1820), a determination is made as to whether a wait parameter has been set (step 1840). If so, a determination is made as to whether a wait threshold has exceeded (step 1850). If not, the operation loops back to step 1820 and continues to loop until the wait threshold is exceeded or until a connection specific application buffer is allocated.

If the wait threshold has been exceeded (step 1850) or a wait parameter has not been set (step 1840), characteristic information for the non-connection specific application buffers in the buffer pool is retrieved from the host system (step 1860). A non-connection specific application buffer is then selected from this pool based on the retrieved characteristic information (step 1870). The data is then transferred directly into the selected non-connection specific application buffer using a DMA operation (step 1880) and the operation terminates.

An additional design may permit direct data placement into the L3 cache architecture as an option to DMA placement. That is, data may be pushed into the L3 cache using a cache injection mechanism and a virtual address provided by the host system. Instead of or in addition to.DMA placement of the data in application buffers, data that needs to be processed quickly may be provided to the L3 cache for immediate processing.

There are many ways in which it can be decided whether specific data should be injected into the L3 cache or not. For example, the determination of which data should be injected into the L3 cache may be based on explicit configuration information established by host system per connection. Alternatively, this determination may be based on monitoring how much data has already been injected into the L3 cache recently to determine if a cache overflow situation is probable. Other mechanisms thatdeter whether injection of the data into the L3 cache would obtain any benefit or cause cache overflow may also be used.

As mentioned above, this type of memory management mechanism might be preferable for certain traffic that requires immediate CPU attention such as web request/response traffic. Other types of data, such as ISCSI data, that is prefetched for the file system might be better off as a DMA since it may not be required for some time. This parameter can be identified based on the origin of the request for network reads or configuration parameters.

It should be appreciated that although the alternative embodiment described above makes reference to injection of data into the L3 cache, this embodiment is not limited to use with an L3 cache. L3 is preferred in the exemplary embodiment since it has a physical address mapping in many known architectures. This reduces the complexity in the design of moving the data directly from the Input/Output device. However, in emerging network adapters, such as the RDMA network adapters of system area networks such as InfiniBand, a user address may be provided that allows data injection into a virtual addressable L3 cache as well as any other cache in the memory hierarchy. Additionally, an address translation can be made from real to virtual, thereby providing the necessary address for any type of cache. Thus, the mechanisms of the exemplary alternative embodiment may be applied to any level cache depending on the particular architecture of the system.

In a further aspect of the present invention, the offload network adapter may contain logic for reassembling separate but in-order segments of data buffers. The descriptors generated by the offload network adapter may be examined prior to posting the descriptors to the output descriptor table, to see if the data to be moved is to a consecutive physical address space. If multiple descriptors are generated that identify consecutive physical addresses in memory, then rather than posting a plurality of descriptors to the output descriptor table, the data to be transferred may be combined in an offload network adapter and a single combined descriptor may be used to identify each data transfer. For example, TCP/IP segments may be reassembled into appropriately sized buffers (e.g. 4 K page aligned data) and communicated in bulk to the host system. This provides for easier data buffer management on the host system and greater efficiency. This can potentially reduce the amount of buffers required to service these multiple connections.

In a further aspect of an exemplary embodiment of the present invention, the offload network adapter is provided with logic for examining data within a received packet but not consume the data. A receive call may specify a "peek" option which may provide a copy of a portion, e.g., the header, of the data packet received to the host application. This may allow the host application to examine the header data and make decisions on how the payload can be consumed. As an example, an application may be expecting to receive different types of data tagged by a header identifier. This is particular useful in cases where the header and the payload data is of variable length. The program can simply "peek" on the maximum length of any header to examine header information. Peeking at the header may allow the program to determine which application buffer to send the payload of the data packet to based on the intended program stream.

Thus, when the "peek" option is set for a connection in the offload network adapter, a copy of the header of a received data packet is provided to the host application when then determines what type of data is being received and which socket, i.e. connection, to transmit the data packet payload over. For example, an application may have separate connections for video data and audio data. From the header, the application may be able to determine a type of data in the payload of a data packet. If the data is video data, the peek operation permits the host application to designate that the data packet payload should be DMA'd to the application buffer associated with a first connection. If the data is audio data, the peek operation permits the host application to designate that the data packet payload should be DMA'd to the application buffer associated with a second connection.

To compliment this peek operation, an option is provided to read data with an offset. In this way, the payload of the data packet may be easily separated from the header which was peeked upon. That is, since the host application knows the actual size of the header, an offset may be generated and stored for use in skipping over the header when processing the data packet. This is most useful when the header is smaller than the number of bytes specified in the peek operation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for transferring data to a host system from a network adapter, comprising:
   receiving, in the network adapter, the data for transferring to the host system;
   determining whether a connection specific application buffer is allocated for a connection associated with the data;
   determining whether to wait for a specific application buffer to be allocated for the connection associated with the data, responsive to a determination that a connection specific application buffer has not been allocated for the connection;

selecting a non-connection specific application buffer from a pool of buffers to receive the data responsive to a determination not to wait for a specific application buffer to be allocated;

transferring the data to the selected non-connection specific application buffer;

examining descriptors generated by the network adapter for the data: determining whether the descriptors reference a consecutive physical address space; and providing the descriptors to the host system in a single bulk transaction between the network adapter and the host system responsive to a determination that the descriptors reference a consecutive physical address space.

2. The method of claim 1, further comprising: waiting for a connection specific application buffer to be allocated for the connection associated with the data, responsive to a determination to wait for a specific application buffer to be allocated.

3. The method of claim 2, wherein waiting for a connection specific application buffer includes: determining whether a maximum wait time is met or exceeded; and discontinuing waiting for a connection specific application buffer responsive to a determination that the maximum wait time is met or exceeded.

4. The method of claim 3, wherein the maximum wait time is determined based on historical data of the host system supplying connection specific application buffers.

5. The method of claim 1, wherein determining whether to wait for a connection specific application buffer to be allocated includes determining whether a wait parameter has been set in the network adapter.

6. The method of claim 1, wherein determining whether to wait for a connection specific application buffer includes determining, in the network adapter, whether to wait for a connection specific application buffer based on historical data of the host system supplying connection specific application buffers.

7. The method of claim 1, wherein selecting a non-connection specific application buffer from a pool of buffers to receive the data includes:

using characteristic information for each non-connection specific application buffer in the pool of buffers to determine a best match for the data.

8. The method of claim 7, wherein the characteristic information includes at least one of buffer size, buffers speed, and placement of the buffer in the host processor architecture.

9. The method of claim 1, further comprising: determining whether the data should be injected into an L3 cache of the host system; and transferring the data directly to the L3 cache using a cache injection mechanism responsive to a determination that the data should be injected into the L3 cache of the host system.

10. The method of claim 1, further comprising: peeking at a header of the data to determine a type of the data; and identifying a connection for routing the data based on the type of the data.

11. The method of claim 10, further comprising:

determining a size of the header based on peeking at the header; and setting an offset for skipping over the header and accessing a payload of the data based on the size of the header.

12. A computer program product in a computer recordable medium for transferring data to a host system from a network adapter, comprising:

first instructions for receiving, in the network adapter, the data for transferring to the host system;

second instructions for determining whether a connection specific application buffer is allocated for a connection associated with the data;

third instructions for determining whether to wait for a specific application buffer to be allocated for the connection associated with the data, responsive to a determination that a connection specific application buffer has not been allocated for the connection;

fourth instructions for selecting a non-connection specific application buffer from a pool of buffers to receive the data responsive to a determination not to wait for a specific application buffer to be allocated;

fifth instructions for transferring the data to the selected non-connection specific application buffer;

sixth instructions for examining descriptors generated by the network adapter for the data;

seventh instructions for determining whether the descriptors reference a consecutive physical address space; and eighth instructions for providing the descriptors to the host system in a single bulk transaction between the network adapter and the host system responsive to a determination that the descriptors reference a consecutive physical address space.

13. The computer program product of claim 12, further comprising:

ninth instructions for waiting for a connection specific application buffer to be allocated for the connection associated with the data, responsive to a determination to wait for a specific application buffer to be allocated.

14. The computer program product of claim 13, wherein the ninth instructions for waiting for a connection specific application buffer include:

instructions for determining whether a maximum wait time is met or exceeded; and instructions for discontinuing waiting for a connection specific application buffer responsive to a determination that the maximum wait time is met or exceeded.

15. The computer program product of claim 14, wherein the maximum wait time is determined based on historical data of the host system supplying connection specific application buffers.

16. The computer program product of claim 12, wherein the third instructions for determining whether to wait for a connection specific application buffer to be allocated include instructions for determining whether a wait parameter has been set in the network adapter.

17. The computer program product of claim 12, wherein the third instructions for determining whether to wait for a connection specific application buffer include instructions for determining, in the network adapter, whether to wait for a connection specific application buffer based on historical data of the host system supplying connection specific application buffers.

18. The computer program product of claim 12, wherein the fourth instructions for selecting a non-connection specific application buffer from a pool of buffers to receive the data include:

instructions for using characteristic information for each non-connection specific application buffer in the pool of buffers to determine a best match for the data.

19. The computer program product of claim 18, wherein the characteristic information includes at least one of buffer size, buffers speed, and placement of the buffer in the host processor architecture.

20. The computer program product of claim 12, further comprising:

ninth instructions for determining whether the data should be injected into an L3 cache of the host system; and tenth instructions for transferring the data directly to the L3 cache using a cache injection mechanism responsive to a determination that the data should be injected into the L3 cache of the host system.

21. The computer program product of claim 12, further comprising:

ninth instructions for peeking at a header of the data to determine a type of the data; and tenth instructions for identifying a connection for routing the data based on the type of the data.

22. The computer program product of claim 21, further comprising:

eleventh instructions for determining a size of the header based on peeking at the header; and ninth instructions for setting an offset for skipping over the header and accessing a payload of the data based on the size of the header.

23. A system for transferring data to a host system from a network adapter, comprising:

mechanism for receiving, in the network adapter, the data for transferring to the host system;

mechanism for determining whether a connection specific application buffer is allocated for a connection associated with the data;

mechanism for determining whether to wait for a specific application buffer to be allocated for the connection associated with the data, responsive to a determination that a connection specific application buffer has not been allocated for the connection;

mechanism for selecting a non-connection specific application buffer from a pool of buffers to receive the data responsive to a determination not to wait for a specific application buffer to be allocated;

mechanism for transferring the data to the selected non-connection specific application buffer;

mechanism for examining descriptors generated by the network adapter for the data;

mechanism for determining whether the descriptors reference a consecutive physical address space; and mechanism for providing the descriptors to the host system in a single bulk transaction between the network adapter and the host system responsive to a determination that the descriptors reference a consecutive physical address space.

24. The system of claim 23, further comprising: mechanism for waiting for a connection specific application buffer to be allocated for the connection associated with the data, responsive to a determination to wait for a specific application buffer to be allocated.

25. The system of claim 24, wherein the mechanism for waiting for a connection specific application buffer includes:

mechanism for determining whether a maximum wait time is met or exceeded; and mechanism for discontinuing waiting for a connection specific application buffer responsive to a determination that the maximum wait time is met or exceeded.

26. The system of claim 25, wherein the maximum wait time is determined based on historical data of the host system supplying connection specific application buffers.

27. The system of claim 23, wherein the mechanism for determining whether to wait for a connection specific application buffer to be allocated includes mechanism for determining whether a wait parameter has been set in the network adapter.

28. The system of claim 23, wherein the mechanism for determining whether to wait for a connection specific application buffer includes mechanism for determining, in the network adapter, whether to wait for a connection specific application buffer based on historical data of the host system supplying connection specific application buffers.

29. The system of claim 23, wherein the mechanism for selecting a non-connection specific application buffer from a pool of buffers to receive the data includes:

mechanism for using characteristic information for each non-connection specific application buffer in the pool of buffers to determine a best match for the data.

30. The system of claim 29, wherein the characteristic information includes at least one of buffer size, buffers speed, and placement of the buffer in the host processor architecture.

31. The system of claim 23, further comprising: mechanism for determining whether the data should be injected into an L3 cache of the host system; and mechanism for transferring the data directly to the L3 cache using a cache injection mechanism responsive to a determination that the data should be injected into the L3 cache of the host system.

32. The system of claim 23, further comprising:

mechanism for peeking at a header of the data to determine a type of the data;

and mechanism for identifying a connection for routing the data based on the type of the data.

33. The system of claim 32, further comprising:

mechanism for determining a size of the header based on peeking at the header;

and mechanism for setting an offset for skipping over the header and accessing a payload of the data based on the size of the header.

* * * * *